(12) United States Patent
Zhou et al.

(10) Patent No.: US 9,451,563 B2
(45) Date of Patent: Sep. 20, 2016

(54) TECHNIQUES FOR ENERGY DETECTION LEVEL ADJUSTMENTS

(71) Applicant: QUALCOMM Incorporated, San Diego, CA (US)

(72) Inventors: Yan Zhou, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/516,323

(22) Filed: Oct. 16, 2014

(65) Prior Publication Data

US 2016/0112969 A1 Apr. 21, 2016

(51) Int. Cl.
*H04W 4/00* (2009.01)
*H04W 52/36* (2009.01)
*H04W 24/08* (2009.01)
*H04W 72/04* (2009.01)
*H04W 48/08* (2009.01)
*H04W 84/12* (2009.01)

(52) U.S. Cl.
CPC ............ *H04W 52/36* (2013.01); *H04W 24/08* (2013.01); *H04W 48/08* (2013.01); *H04W 72/0473* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,526,308 B2 | 4/2009 | Guo et al. | |
| 2005/0152313 A1* | 7/2005 | Cave | H04W 74/08 370/333 |
| 2005/0266803 A1* | 12/2005 | Dinur | H04B 1/1027 455/67.11 |
| 2005/0271133 A1* | 12/2005 | Waxman | H04B 1/1027 375/227 |
| 2006/0251032 A1* | 11/2006 | Roy | H04W 4/0808 370/338 |
| 2007/0072638 A1* | 3/2007 | Yang | H04W 52/50 455/522 |
| 2007/0270102 A1* | 11/2007 | Zhu | H04W 48/10 455/69 |
| 2010/0165861 A1 | 7/2010 | Rrdland et al. | |
| 2013/0012134 A1* | 1/2013 | Jin | H04B 17/345 455/62 |
| 2014/0126471 A1 | 5/2014 | Sampath et al. | |

FOREIGN PATENT DOCUMENTS

| | | |
|---|---|---|
| CN | 103415023 A | 11/2013 |
| CN | 102395140 B | 12/2013 |
| EP | 1349412 A2 | 10/2003 |
| WO | WO-2006115823 A2 | 11/2006 |

OTHER PUBLICATIONS

ISA/EPO, International Search Report and Written Opinion of the International Searching Authority, Int'l. App. No. PCT/US2015/051659, Feb. 1, 2016, European Patent Office, Rijswijk, NL, 19 pgs.
ISA/EPO, Partial International Search Report of the International Searching Authority, Int'l App. No. PCT/US2015/051659, Dec. 22, 2015, European Patent Office, Rijswijk, NL, 9 pgs.

* cited by examiner

*Primary Examiner* — Anh-Vu Ly
(74) *Attorney, Agent, or Firm* — Holland & Hart LLP

(57) ABSTRACT

Methods, systems, and devices are described for improve network performance, such as throughput and PER, by allowing nodes to adjust energy detection (ED) threshold levels. For example, a method for Wi-Fi wireless communication includes determining, by a first node, an ED threshold level for a second node of a wireless network based at least in part on a metric for the first node. The method may also include signaling, from the first node to the second node, an ED level set element that indicates the determined ED threshold level. In another example, a method includes signaling, by a first node, an ED level adjustment capability of the first node to one or more nodes in a wireless network.

30 Claims, 13 Drawing Sheets

FIG. 5
FIG. 6

TECHNIQUES FOR ENERGY DETECTION LEVEL ADJUSTMENTS

BACKGROUND

The following relates generally to wireless communication, and more specifically to adjusting energy detection levels. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

Generally, a wireless multiple-access communications system may include a number of access points or stations, each simultaneously supporting communication for multiple mobile devices. Stations may communicate with mobile devices on downstream and upstream links Stations may have a coverage range, which may be referred to as the coverage area of the cell. In Wi-Fi systems, a station may perform a clear channel assessment before transmitting, which may consist of detecting a total amount of energy in a channel. If the energy in a channel is above a threshold level, the station may refrain from transmitting until a later time. This energy detection (ED) threshold level may be set to a fixed value. This fixed level may not result in the best performance of the wireless network in terms of throughput or packet error rate (PER).

SUMMARY

The described features generally relate to one or more improved systems, methods, and/or apparatuses for adjusting energy detection threshold levels. For example, a wireless communication network, such as a Wi-Fi network, may include devices such as nodes (e.g., an access point or station) that have adjustable energy detection thresholds. One or more nodes in the wireless communication network may adjust an energy detection (ED) threshold in order to reduce interference. Adjusting an ED threshold higher or lower may cause a node to transmit when there is more or less energy in a channel, respectively. A node may determine a new ED threshold level to adopt based at least in part on one or more metrics collected from the node or other nodes in the wireless communication network. The node may signal an ED threshold level in a new signaling element referred to herein as an "ED level set element." ED threshold levels may be adjusted dynamically based on network conditions.

In a first set of illustrative examples, a method for Wi-Fi wireless communication is described. In one configuration, the method includes determining, by a first node, an ED threshold level for a second node of a wireless network based at least in part on a metric for the first node. The method also includes signaling, from the first node to the second node, an ED level set element that indicates the determined ED threshold level.

The method may also include signaling, by the second node, an ED level adjustment capability of the second node to one or more nodes in the wireless network. In some examples, determining the ED threshold level for the second node further includes determining, by the first node, the ED threshold level for a group of nodes, wherein the second node is part of the group of nodes, and wherein the ED level set element further comprises a group indicator that identifies the group of nodes. In an example, signaling the ED level set element further includes signaling the ED level set element on a primary channel and at least one secondary channel.

In some examples, determining the ED threshold level for the second node may also include determining, by the first node, the ED threshold level for the second node as an amount of dB relative to a received signal strength indication (RSSI) from the first node, wherein the RSSI can be determined by the frame carrying the ED level set element or any frame from the first node. The method may also include determining a RSSI from one of a frame carrying the ED level set element or another frame transmitted by the first node, wherein signaling the ED level set element further comprises signaling an amount of dB relative to the RSSI to instruct the second node to adjust the ED threshold level of the second node by the amount of dB.

In other examples, the method includes signaling a time schedule for executing an ED level adjustment to the determined ED threshold level. In some examples, the time schedule identifies either a single time window start time and a single time window duration or a periodic time window start time, a periodic time window duration, a period, and a number of periods.

In another example, the method also includes signaling a range threshold wherein additional nodes that are within the range threshold are instructed to comply with the ED threshold level, wherein the range threshold identifies one or both of a geographical radius from the first node and a hop count threshold from the first node.

In some examples of the method, the ED level set element further includes a broadcast ignoring duration that instructs the second node to ignore the ED level set element in a broadcast frame for the broadcast ignoring duration responsive to the ED level set element received in unicast or multicast frames.

In another example, the method includes collecting metrics, at the first node, from other nodes in the wireless network, wherein determining the ED threshold level is based at least in part on the metrics collected from the other nodes. The method may further include applying, by the first node, the ED threshold level to the other nodes in the wireless network when a threshold number of the other nodes suffer interference. Examples of the method may also include sending, by the first node, the ED level set element to an access point of the wireless network that instructs the access point to adjust a common ED threshold level for all served nodes of the access point. In yet further examples, the method includes forwarding the ED level set element, by the access point, to other access points in the wireless network.

Another example of the method includes determining, by the first node, interference conditions for neighboring nodes and sending, by the first node, the ED level set element to at least one of the neighboring nodes, to adjust the ED threshold level of the at least one neighboring node to the ED threshold level based at least in part on the interference conditions.

In another example of the method, the ED level set element is a first ED level set element further comprises classifying all nodes in a basic service set (BSS) including the second node into at least two groups, determining a different ED threshold level for each group, and signaling a second ED level set element that indicates the different ED threshold levels for each group to an access point serving the BSS. In some examples, classifying all nodes in the BSS including the second node into at least two groups further includes determining, for each node in the BSS, whether a performance metric of the node exceeds a threshold, wherein the performance metric includes at least one of a throughput of the node, a packet error rate of the node, an access delay, a retry rate, a packet latency, a signal strength between the node and the serving AP. Classifying all nodes in the BSS including the second node into at least two groups may further include classifying each node with the performance metric exceeding the threshold into a first group and classifying each node with the performance metric below the threshold into a second group. Additionally, classifying all of the nodes in the BSS may further include classifying each nodes in the BSS based on a common agreement across all access points in the wireless network.

In another examples, the method may further include allocating dedicated resources to each of the nodes based on the group of the node, wherein the dedicated resources are allocated based on a common agreement across all access points in the wireless network. The method may further include signaling the dedicated resources to the group via an ED level set element for the group.

In a second set of illustrative examples, an device for Wi-Fi wireless communication is described. In one configuration, the device may include an ED level decision unit to determine an ED threshold level for a first node of a wireless network based at least in part on a metric of the first node. The device may further include a transmitter to signal an ED level set element that indicates the determined ED threshold level.

In a third set of illustrative examples, an apparatus for Wi-Fi wireless communication is described. In one configuration, the apparatus may include a processor and memory in electronic communication with the processor and instructions stored in the memory. The instructions are executable by the processor to determine an ED threshold level for a node of a wireless network based at least in part on a metric. The instructions are further executable by the processor to signal an ED level set element that indicates the determined ED threshold level.

In a fourth set of illustrative examples, a method for Wi-Fi wireless communication is described. In one configuration, the method includes signaling, by a first node, an ED level adjustment capability of the first node to one or more nodes in a wireless network. The method may also include receiving, by the first node, a first ED level set element that identifies a common ED threshold level and adjusting, by the first node, an ED threshold level to the common ED threshold level.

In another example, the method includes determining a range threshold within which the common ED threshold level applies. The method may also include determining whether the first node is within the range threshold, wherein adjusting the ED threshold level to the common ED threshold level is based on the determination that the first node is within the range threshold. In another example of the method, the method includes determining a broadcast ignoring duration from the first ED level set element, wherein the broadcast ignoring duration instructs the first node to ignore a second ED level set element in a broadcast frame that is received at the first node during the broadcast ignoring duration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 shows a conceptual diagram of an example of an energy detection level set element;

FIG. 6 shows a conceptual diagram of an example of a multi-group energy detection level set element;

DETAILED DESCRIPTION

Figure 1:
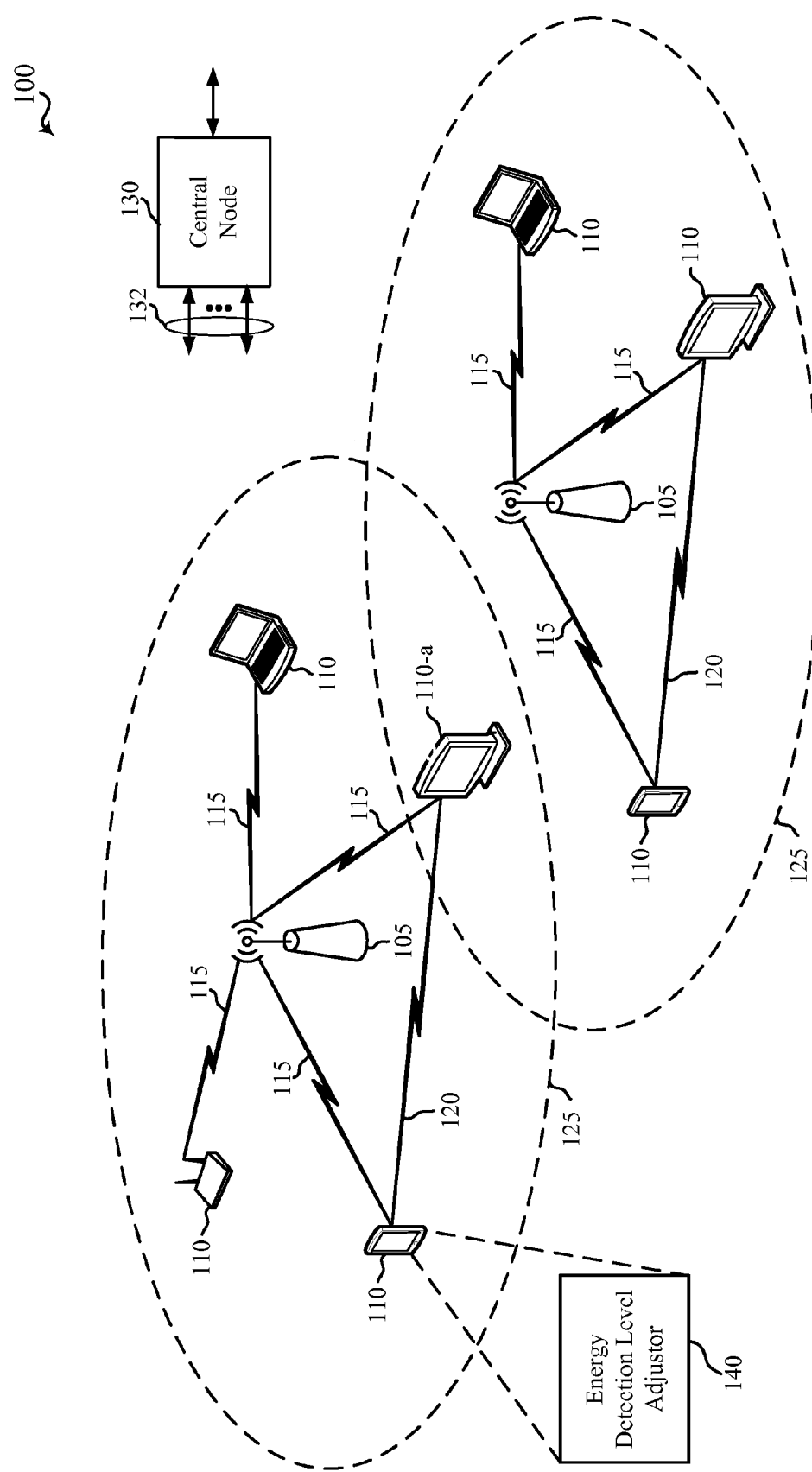
FIG. 1 shows a block diagram of a wireless communications system.

Adjustment and signaling of energy detection thresholds in a wireless communications system is described. In a wireless communications system, such as Wi-Fi systems, before transmitting, a node may perform a clear channel assessment consisting of detecting a total amount of energy in a channel. The station may transmit when the energy detected in the channel is below the ED threshold level. In examples described herein, the energy detection (ED) threshold level is adjustable dynamically. The ED level may be adjusted dynamically in order to reduce interference, improve throughput, or improve a packet error rate.

To determine which ED level to set as the ED threshold level, one or more metrics of the wireless communications network may be collected and analyzed. The metrics may be related to interference experienced by a node. A node or access point may determine if the node is significantly suffering interference based on the metrics. For example, a node may be determined to be suffering interference if a reported PER is much higher than an estimated interference-free PER. In another example, a node may be determined to be suffering interference if physical layer convergence procedure (PLCP) protocol data units (PPDUs) are frequently hit by interference in the middle (e.g., after a preamble).

Techniques described herein also provide different options for signaling an ED threshold level. For example, a node may signal an adjusted ED threshold level to other nodes of the wireless communications network. The node may signal the adjusted ED threshold level in an "ED level set element." The ED level set element may identify a new ED threshold level that one or more nodes, which may or may not include the signaling node, have set or are instructed to set as their ED threshold levels. A node may also signal additional information related to adjusting ED threshold levels, such as a group of nodes to adjust their ED thresholds, a time schedule for adjusting the ED threshold levels, a range threshold, and a broadcast ignoring duration. This additional information may be included in the ED level set element or may be signaled in a separate element.

This disclosure also describes several different methods for ED level adjustments. In one example, a common ED level adjustment is described. A common ED level adjustment may be performed in a centralized or coordinated manner. In a centralized adjustment, a central node may collect metrics from other nodes in the network and determine a common ED threshold level. The central node may signal other nodes to adjust to the common ED threshold level. In a coordinated adjustment, an access point may adjust the ED threshold levels across the network if a certain number of nodes in a basic service set (BSS) of the access point suffer interference. In another example, a selective ED level adjustment is described. A selective ED level adjustment may be coordinated between one or more nodes suffering interference and one or more nodes causing the interference.

Referring first to FIG. 1, a block diagram of a wireless communications system 100 is shown. The wireless communications system 100 may be an example of a WLAN network. The WLAN network may include one or more access points (APs) 105, one or more wireless devices or stations (STAs) 110, and a central node 130. While only two APs 105 are illustrated, the WLAN network may have more than two APs 105. Each of the wireless stations 110, which may also be referred to as mobile stations (MSs), stations, nodes, mobile devices, access terminals (ATs), user equipment (UE), subscriber stations (SSs), or subscriber units, may associate and communicate with an AP 105 via a communication link 115. Each AP 105 has a geographic coverage area 125 such that wireless stations 110 within that area can typically communicate with the AP 105. The wireless stations 110 may be dispersed throughout the geographic coverage area 125. Each wireless station 110 may be stationary or mobile. The APs 105 interface with the central node 130 through backhaul links 134. The APs 105 may operate under the control of the central node 130. In various examples, the APs 105 may communicate, either directly or indirectly (e.g., through the central node 130), with each other over the backhaul links 134, which may be wired or wireless communication links. As used herein, the term "node" may apply to either an AP 105 or a wireless station 110.

A wireless station 110, such as wireless station 110-a, can be covered by more than one AP 105 and can therefore associate with one or more APs 105 at different times. A single AP 105 and an associated set of stations 110 may be referred to as a BSS. An extended service set (ESS) is a set of connected BSSs. A distribution system (DS) may be used to connect APs 105 in an extended service set. A geographic coverage area 125 for an access point 105 may be divided into sectors making up only a portion of the coverage area. The WLAN network may include access points 105 of different types (e.g., metropolitan area, home network, etc.), with varying sizes of coverage areas and overlapping coverage areas for different technologies. Other wireless devices can also communicate with the AP 105.

While the wireless stations 110 may communicate with each other through the AP 105 using communication links 115, each wireless station 110 may also communicate directly with one or more other wireless stations 110 via a direct wireless link 120. Two or more wireless stations 110 may communicate via a direct wireless link 120 when both wireless stations 110 are in the AP geographic coverage area 125 or when one or neither wireless station 110 is within the AP geographic coverage area 125. Examples of direct wireless links 120 may include Wi-Fi Direct connections, connections established by using a Wi-Fi Tunneled Direct Link Setup (TDLS) link, and other P2P group connections. In other implementations, other peer-to-peer connections and/or ad hoc networks may be implemented within WLAN network. The stations 110 may be mobile stations, personal digital assistants (PDAs), other handheld devices, netbooks, notebook computers, tablet computers, laptops, display devices (e.g., TVs, computer monitors, etc.), printers, etc.

The central node 130 may be a server, a central controller, or an AP. The central node 130 may connect to the APs 105 in the wireless communications system 100. The central node 130 may be connected to the APs 105 through a wired or wireless backhaul, such as through backhaul links 132. In other examples, the central node 130 may connect to the APs 105. Each AP 105 may provide the central node 130 with one or more metrics from the BSS that the AP 105 serves.

Before transmitting on a channel, each AP 105 and wireless station 110 may detect an energy level on the channel. The AP 105 or the wireless station 110 may compare the detected energy level to an ED threshold level. If the detected energy level is higher than the ED threshold level, the AP 105 or the wireless station 110 may refrain from transmitting until a later time when the detected energy on the channel is below the ED threshold level.

However, one or more of the APs 105 and the wireless stations 110 may have an adjustable ED threshold level. That is, one or more of the nodes in the wireless communications system 100 may adjust its ED threshold level higher or lower, depending on, for example, network conditions. The ED threshold levels may be adjusted, for example, for only one wireless station 110, for an AP 105 and all of the wireless stations 110 in the BSS of the AP 105, for two or more APs 105 or wireless stations 110, or across the entire wireless communications system 100. By adjusting the ED threshold levels, the wireless communications system 100 may see improved throughput or PER. For example, as shown in FIG. 1, a wireless station 110 includes an energy detection level adjustor 140. The ED level adjustor 140 may adjust an ED threshold level of the wireless station 110. One or more other wireless stations 110 and/or APs 105 may include an ED level adjustor 140.

Figure 2:
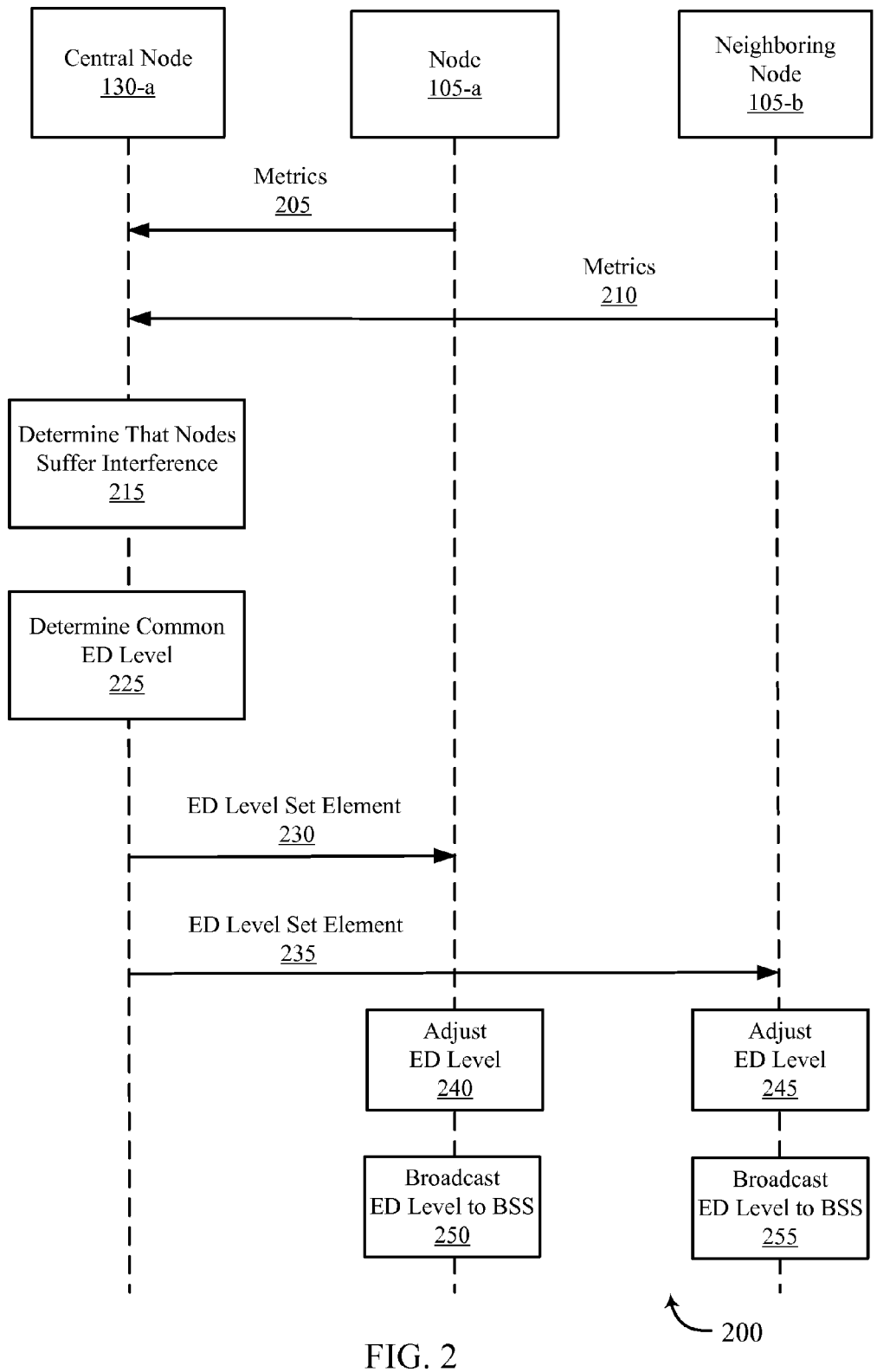
FIG. 2 shows a flow diagram of an example wireless communications system to perform a centralized energy detection level adjustment.

FIG. 2 shows a flow diagram 200 of an example wireless communications system to perform a centralized energy detection level adjustment. The flow diagram 200 illustrates example communications between a central node 130-*a* e.g., a node 105-*a* (e.g., an AP 105), and a neighboring node 105-*b* (e.g., another AP 105). In this example, the neighboring node 105-*b* is a neighboring node of the node 105-*a*. The central node 130-*a* may be an example of aspects of the central node 130 described with reference to FIG. 1. In some examples, one or more of the nodes 105-*b* and 105-*c* may be an example of aspects of at least one of the APs 105 described with reference to FIG. 1. In other examples, one or more of the nodes 105-*a* and 105-*b* may be an example of aspects of at least one of the wireless stations 110 described with reference to FIG. 1. For illustrative purposes, the nodes 105-*a* neighboring node 105-band 105-*b* are described in the example of FIG. 2 as access points 105.

As described herein, a centralized ED level adjustment is a form of common ED level adjustment across the network, such as the wireless communications network 100 of FIG. 1, wherein all nodes adjust their ED levels to a common ED level. In the centralized ED level adjustment, the central node 130 may collect metrics from other nodes, such as nodes 105-*a* and 105-*b*, in the wireless communications network. Using the metrics, the central node 130 may determine the common ED threshold level that all the nodes 105 in the network will use. In some examples, a common ED threshold level may be used if most nodes in the wireless communications network significantly suffer interference.

In this example, the node 105-*a* may send information related to one or more metrics 205 of nodes in a BSS of the node 105-*a* to the central node 130. The neighboring node 105-*b* may send information related to one or more metrics 210 of the neighboring node 105-*b* to the central node 130. The central node 130 may collect metrics from each AP for each BSS in the wireless communications network. The metrics 205 and 210 may be performance metrics. Example performance metrics include station throughput, PER, medium usage, access delay, link RSSI, link SNR, and/or percentage of node's PPDUs suffering interference.

The central node 130-*a* may determine whether most nodes significantly suffer interference such that changing the common ED threshold level of all nodes in the wireless communications network may reduce the interference. The central node 130-*a* may determine whether modes nodes significantly suffer interference at block 215 from the metrics 205 and 210. The central node 130-*a* may determine whether most nodes significantly suffer interference based on the received performance metrics.

The central node 130-*a* may determine that one or more receiving nodes are significantly suffering interference in one of several ways. For example, a transmitter or a receiver may detect whether the receiver is significantly suffering interference when Physical Layer Convergence Protocol (PLCP) protocol data units (PPDUs) are frequently hit by interference in the middle, that is, sometime after the preamble. A receiving node may determine that a PPDU is hit after the preamble by examining sudden changes of received signal strength indication (RSSI) and estimated phase and/or frequency within each PPDU. A transmitting node may determine that a PPDU is hit after the preamble via block acknowledgement (BA) results. In another example, a receiving node may explicitly inform the transmitting node of that the receiving node is suffering interference. Another way in which the central node 130-*a* may determine that one or more receiving nodes are suffering interference is whether the PER is much higher than an estimated interference-free PER. For example, a receiving node may be suffering interference if the actual reported PER is greater than a PER based on a signal-to-noise ratio (SNR) of the link for a given modulation and coding scheme (MCS). These metrics may be determined from either the receiving node or the transmitting node. For example, the transmitting node of the link can measure the actual PER and estimate the link SNR based on an acknowledgement (ACK) RSSI from the receiving node.

In other examples, other methods for determining whether a node is significantly suffering interference may be used. As described above, the metrics for determining whether a receiving node is significantly suffering interference include the percentage of node's PPDUs suffering interference, actual PER, and link SNR. Those metrics may be reported by either the transmitting or receiving node to the associated AP (e.g., either node 105-*a* or 105-*b*), which will further relay those metrics to the central node 130-*a*. The central node 130-*a* may decide if most nodes in the network are significantly suffering interference. For example, a node is significantly suffering interference if the percentage of its PPDUs suffering interference exceeds a threshold, e.g., 50%. In other examples, other percentages may be used.

If most nodes suffer interference, the central node 130-*a* may also determine whether there is a common ED threshold level that would improve overall performance of the wireless communications network at block 220. For example, the central node 130-*a* may determine a common ED threshold level that would improve performance, such as reducing PER and increasing throughput. In one example, the central node 130-*a* uses trial and error with different ED threshold levels to determine the common ED threshold level. The common ED threshold level may be found if it maximizes a mean or certain percentile of station throughput.

Once the central node 130-*a* has determined a common ED threshold level, the central node 130-*a* may signal the common ED threshold level in an ED level set element 225 to the node 105-*a*. The ED level set element 225 may identify the common ED threshold level and also identify the node 105-*a*. The central node 130-*a* may also signal the common ED threshold level in an ED level set element 230 to the neighboring node 105-*b*. The ED level set element 230 may identify the common ED threshold level and the neighboring node 105-*b*. In some examples, the central node 130-*a* transmits individual ED level set element to each of the node 105-*a* and the neighboring node 105-*b*. In other examples, the central node 130-*a* may transmit a single ED level set element 225 for the node 105-*a* and the neighboring node 105-*b*.

Upon receiving the ED level set element 225, the node 105-*a* may determine the common ED threshold level to which it is instructed to set as its new ED threshold. The node 105-*a* may extract the new common ED threshold level from the ED level set element 225. If the node 105-*a* is capable of adaptable ED threshold levels, the node 105-*a* will adjust the ED threshold to the new ED threshold level identified in the ED level set element 225 at block 235. Similarly, the neighboring node 105-*b* may determine, from the ED level set element 230, the common ED threshold level to which it is instructed to set as its new ED threshold. If the neighboring node 105-*b* is capable of adaptable ED threshold levels, the neighboring node 105-*b* will adjust its ED threshold to the common ED threshold level identified in the ED level set element 230 at block 240.

The node 105-*a* may further broadcast the common ED threshold level to all nodes in the BSS of the node 105-*a* (e.g., the stations 110 served by node 105-*a*) at block 245. In some examples, broadcasting the common ED threshold level may include broadcasting the ED level set element 225. In other examples, the node 105-*a* may modify the ED level set element 225 and broadcast the modified version. Likewise, the neighboring node 105-*b* may also broadcast the common ED threshold level to all nodes in the BSS of the neighboring node 105-*b* at block 250.

Figure 3:
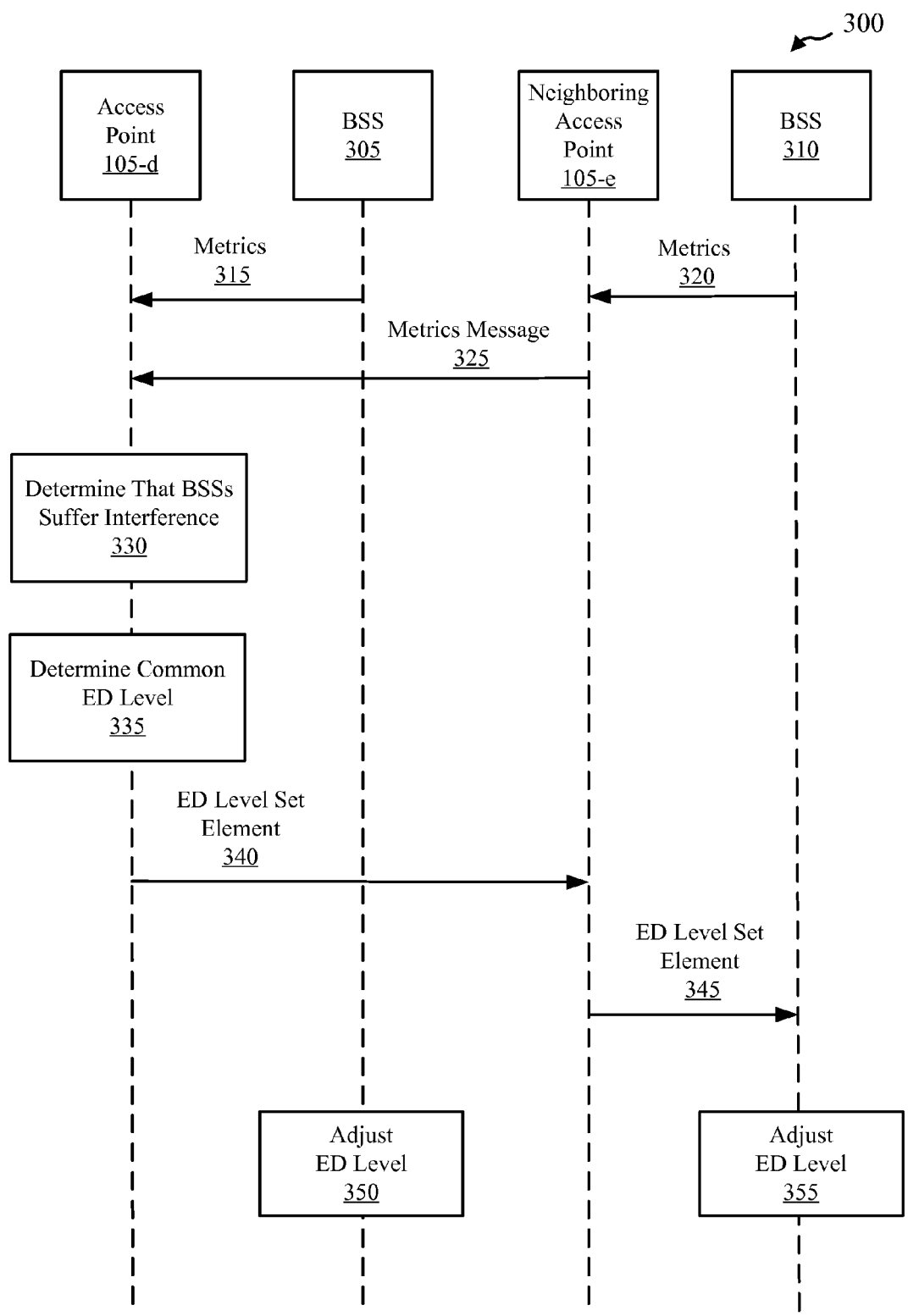
FIG. 3 shows a flow diagram of an example wireless communications system to perform a coordinated energy detection level adjustment.

FIG. 3 shows a flow diagram 300 of an example wireless communications system to perform a coordinated energy detection level adjustment. The flow diagram 300 illustrates example communications between an access point 105-*d*, a basic service set 300, and a neighboring access point 105-*e*. In some examples, one or both of the AP 105-*d* and the neighboring AP 105-*e* may be an example of aspects of at least one of the APs 105 described with reference to FIG. 1. The BSS 305 may include one or more wireless stations 110 described with reference to FIG. 1.

As described herein, a coordinated ED adjustment is a form of common ED level adjustment, wherein an AP initiates adjustment across the wireless communications network, such as wireless communications network 100 of FIG. 1, if most of the nodes in its BSS and in the BSS of a neighboring AP suffer interference. Compared with the centralized ED level adjustment, the coordinated ED adjustment can be initiated by any AP in the network, which may not have global view on metrics of all nodes in the network and may not have wired backhaul connections to all APs in the network. As a result, the initiating AP may trigger the adjustment based on metrics of nodes in its own and neighbor BSSs, and the adjustment decision of the initiating AP may have to propagate to other APs via over-the-air messages. In a coordinated ED adjustment, an AP (e.g., AP 105-*d*) may collect metrics from its BSS (e.g., BSS 305) and from BSSs of other APs (e.g., neighboring AP 105-*e* in BSS 310) in the wireless communications network. Using the metrics, the AP 105-*d* may determine the common ED threshold level that all nodes in the network will use. In some examples, a common ED threshold level may be used if most nodes in the BSS 305 of the AP 105-*d* and the BSS 310 of the AP 105-*e* significantly suffer interference.

In this example, each node in the BSS 305 may send information related to one or more metrics 320 of the node. Likewise, each node in the BSS 310 may send information related to one or more metrics 320 of the node to the AP 105-*e*. The metrics 320 may be performance metrics. Example performance metrics include station throughput, PER, medium usage, access delay, link RSSI, link SNR, and/or a percentage of the node's PPDUs that suffer interference. Based on collected node metrics in its own BSS, each AP 105 may broadcast at least one of the following information: a total number of nodes in its BSS, a percentage of nodes significantly suffering interference in its BSS, and a "poor interference condition" bit. In an example, the poor interference condition bit is set when the percentage of nodes significantly suffering interference exceeds a threshold, e.g., 50%. In the example, the AP 105-*d* receives a metrics message 325 from AP 105-*e*, which contains information regarding the metrics 320. Note that the AP 105-*d* may also receive broadcast information from multiple neighbor APs in the presence of multiple neighbor APs.

The AP 105-*d* may determine whether most nodes in the BSS 305 and the BSS 310 significantly suffer interference at block 330, using the metrics 315 and the metrics message 325. In some examples, the AP 105-*d* may determine whether most of the nodes in the BSS 305 and in all neighboring BSSs (e.g., the BSS 310) significantly suffer interference in the presence of multiple neighbor BSSs. The determination can be done via received broadcast information (such as metrics message 325) from neighbor APs. For example, the AP 105-*d* may determine that most of the nodes in the BSS 305 and all of the neighboring BSSs, including the BSS 310, significantly suffer interference if a percentage of the nodes significantly suffering interference exceeds a threshold. The threshold may be, for example, 50%, or may be another percentage value. Another method by which the AP 105-*d* may determine that most of the nodes in the network significantly suffer interference is if most APs, including the AP 105-*d* and the neighbor AP 105-*e*, have set the "poor interference condition" bit. The bit may function as a flag to indicate that a threshold percentage of stations in the BSS 300 are significantly suffering interference. That is, the bit may be set if a percentage of the stations in the BSS 300 significantly suffer interference is greater than a threshold percentage. The AP 105-*d* may broadcast the bit in a beacon. In another example, the AP 105-*d* may make the determination based only on the nodes in its own BSS (e.g., BSS 305), without considering any neighbor BSSs (e.g., BSS 310).

At block 335, the AP 105-*d* may determine a common ED threshold level that would improve overall performance of the wireless communications network. For example, the AP 105-*d* may determine a common ED threshold level that would reduce PER and/or increase throughput. Similar to the centralized ED level adjustment, the determination can be based on trial and error over a set of candidate common ED threshold levels. In some examples, the AP 105-*d* negotiates with one or more other APs in the wireless communications network, such as neighboring AP 105-*e*, to agree upon a common ED threshold level.

After determining the common ED threshold level, the AP 105-*d* may send an ED level set element 340 to the neighboring AP 105-*e* to inform the neighboring AP 105-*e* of the common ED threshold level. In the presence of multiple neighbor APs, the AP 105-*d* may send the ED level set element 340 to each neighbor AP via unicast, multicast, or broadcast frames. After receiving the ED level set element 340, each neighbor AP, such as AP 105-*e*, may forward the ED level set element 340 to other APs in the network via over the air messages, wired backhaul messages, or a station relay. The neighbor AP 105-*e* will also broadcast the ED level set element 345 to all nodes in its own BSS 310, so the nodes in the BSS 310 will set their ED threshold according to the common ED level threshold indicated in the ED level set element 345.

The common ED level adjustment 340 sent by the initiating AP 105-*d* may include one or more of a new common ED threshold level (e.g., for primary 20 MHz and secondary 20, 40, and 80 MHz channels), a time schedule for performing the adjustment, a range threshold, and an identification (ID) and coordinates of the AP initiating the ED level set element 340, e.g., AP 105-*d*. In one example, a time schedule for a node performing an ED level adjustment may define a single time window that defines a start time and a duration during which the node should keep its ED level to the new ED threshold level. In one example, a time schedule for a node performing an ED level adjustment may define a periodical time window. The periodical time window may identify a start time, a duration, a period over which a new ED threshold level may be determined, and a number of periods that the ED threshold level will be determined.

A range threshold may define how large of an area to which the common ED threshold level 340 applies. The range threshold may include, in one example, information related to a geographical distance from the initiating AP, e.g., AP 105-d, such that APs that are located within the geographical distance have to obey the ED level set element 340 and adjust their ED levels. For example, the geographical distance may be a radius from the AP 105-d or a defined geographical area, such as the coverage area 125 of FIG. 1. For example, APs within the range threshold need to obey the ED level set element 340 and forward the ED level set element 340 if the APs are a distance less than the range threshold from the AP 105-d. In another example, the range threshold may include information related to a hop count from the AP 105-d. For example, any AP within two hops of the AP 105-d must obey the ED level set element 340. One reason to include a range threshold may be that if an AP is too far away from the AP experiencing the interference, such as AP 105-d, it may not be beneficial for that far away AP to use the common ED threshold level. At block 350, the nodes of the BSS 305 adjust their ED threshold levels to the common ED threshold level. At block 355, the nodes of the BSS 310 adjust their ED threshold levels to the common ED threshold level.

As a further extension of the common ED level adjustment, different common ED levels may be applied to a subset of stations in a BSS. For example, the stations in each BSS may be divided into different groups. A different common ED levels may be applied to each group for the communications of the stations with the associated AP.

For example, the stations in a BSS can be divided into two groups: one with relatively good performance and the other with relatively poor performance. The classification of a station into one group or the other may be based on whether a performance metric of the station exceeds a threshold. For example, stations classified into the poor performance category can be identified if their path loss (or received signal strength indication (RSSI)) from the associated AP is above (or below) a threshold. This may occur, for example, if the stations are near an edge of the coverage area of the associated AP. Alternatively, stations classified into the poor performance category can be identified if their quality of service (QoS) is below a threshold or in the top worst percentile among all stations in the same BSS. The QoS may include the throughput of the station, access delay, packet error rate (PER), packet latency, retry rate, and the like. In some examples, the classification of poor and good stations can be based on rules commonly agreed by all BSSs in a network.

In the above example, the communications of different groups of a BSS with the associated AP may use different dedicated resources (e.g., different time slots or frequency bands for the station groups with good and poor performance, respectively). In some examples, the dedicated resource partition may be common to all BSSs in a network.

In some examples, a higher common ED level may be used for the communications of the station group having good performance with the associated AP to improve a medium reuse of the group, since those stations may be generally close to the AP and hence less affected by overlapping basic service set (OBSS) interference. Likewise, a lower common ED level can be used for the communications of the node group with poor performance with the associated AP to reduce mutual interference by increasing deferral sensitivity, since the stations may be generally further from the AP and hence may be more affected by OBSS interference.

To signal a different common ED level per group, each AP may send an ED level set element to each group to indicate the corresponding common ED level and dedicated resource, e.g., a dedicated time slot. In addition, the common ED level per group may be determined by the central node in the centralized method or by the initiating the AP in the coordinated method.

Figure 4:
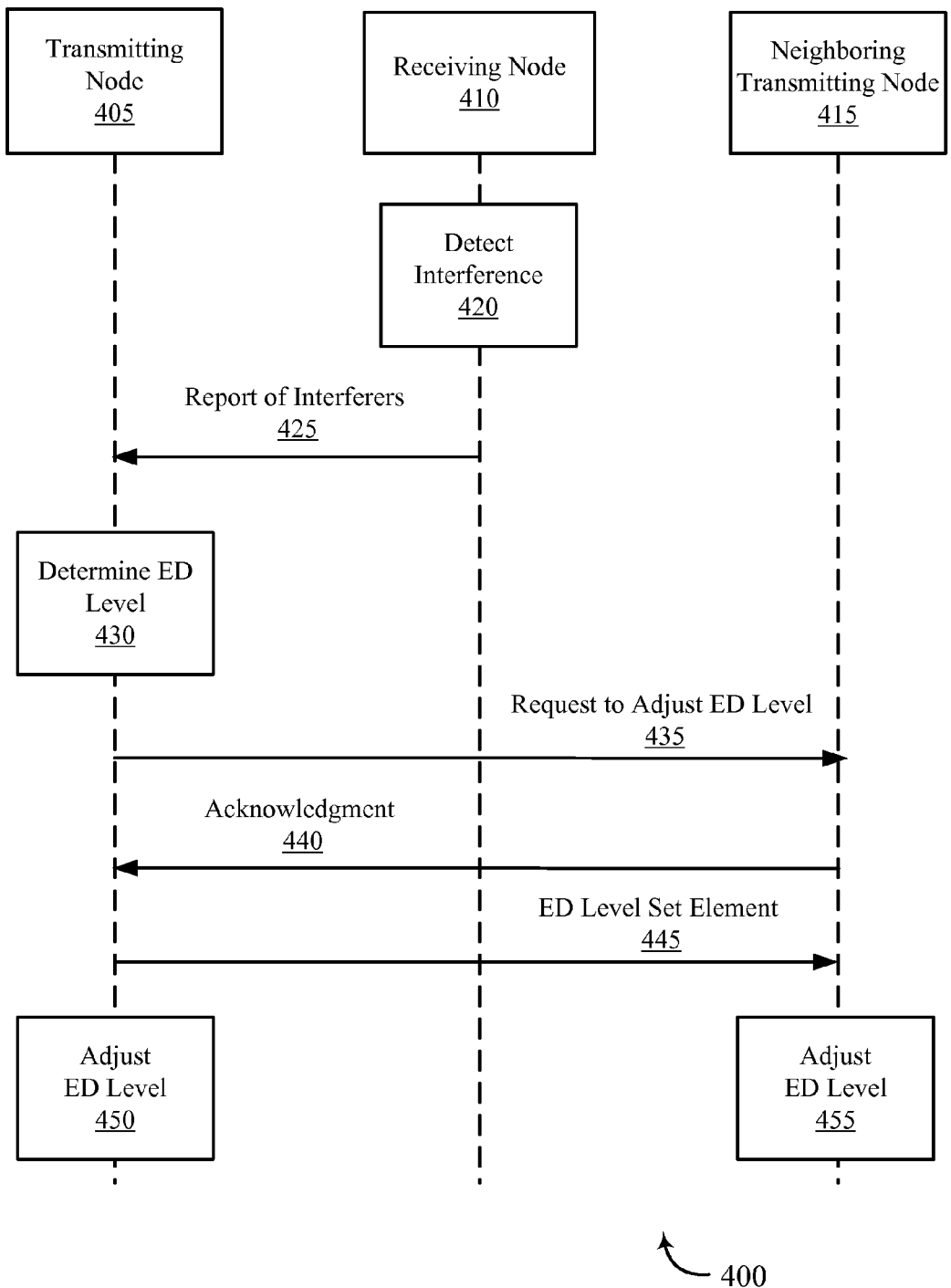
FIG. 4 shows a flow diagram of an example wireless communications system to perform a selective energy detection level adjustment.

FIG. 4 shows a flow diagram 400 of an example wireless communications system to perform a selective energy detection level adjustment. The flow diagram 400 illustrates example communications between a transmitting node 405, a receiving node 410, and a neighboring transmitting node 415. In some examples, one or more of the nodes 405, 410, and 415 may be an example of aspects of at least one of the APs 105 described with reference to FIGS. 1 and 3, an example of aspects of at least one of the stations 110 described with reference to FIG. 1, and/or an example of aspects of at least one of the nodes 105 described with reference to FIG. 2.

As described herein, a selective energy detection level adjustment is an adjustment between two or a few nodes. In this example, the receiving node 410 determines it is experiencing interference at block 420. The receiving node 410 is currently receiving traffic from the desired transmitting node 405. The receiving node 410 may determine that the neighboring transmitting node 415 is causing interference. In one example, the neighbor transmitting node 415 is identified as an interferer in if its frames' RSSI received at the receiving node 410 is greater than a threshold level. In another example, the neighbor transmitting node 415 is identified as an interferer if the neighbor transmitting node 415 caused medium usage at the receiving node 410 to be greater than a threshold level. In another example, the neighbor transmitting node 415 is identified as an interferer if the receiving node 410 detects that PPDUs from the desired transmitting node 405 are frequently interfered with by frames from the neighbor transmitting node 415 (e.g., the frames from the neighbor transmitting node 415 frequently arrive in the middle of PPDUs from the transmitting node 405 with much higher RSSI). In general, the receiving node 410 may identify interferer based on any combination of above criterions. The various thresholds used in those criterions may be set by the desired transmitting node 405.

Once the interferer has been identified, the receiving node 410 may transmit, despite the interference or during a time when the interference is less, a report of interferers 425 to the transmitting node 405. In some examples, the receiving node 410 may autonomously report the interferers once they are identified. In other examples, the receiving node 410 may report the interferers upon receiving a request from the transmitting node 405. In the report of interferers 425, the receiving node 410 may include one or more of the following information, among other information, for each detected interferer: an ID of the interferer, a caused RSSI, a media usage (MU), a percentage of PPDUs received from the transmitting node 405 and interfered by this interferer.

Based at least in part on the report of interferers 425, the transmitting node 405 may determine a joint ED level at block 430. The transmitting node 405 may select one or more of the interferers to request that a subset of nodes adjusts to a joint ED threshold level. For example, the transmitting node 405 may select a subset of the interferers, such as the neighboring transmitting node 415, for doing a joint ED threshold level adjustment. The transmitting node 405 may select a number of top interferers in terms of caused RSSI, MU, or percentage of PPDUs interfered with by this interferer at the receiving node 410. Once the selected interferers are identified, the transmitting node 405 may send a request to adjust ED level 435 to the selected interferers, such as neighboring transmitting node 415 in the example of FIG. 4. The transmitting node 405 may send the request 435 to each selected interferer in a unicast or multicast frame. The request 435 may include a new ED level and time schedule for joint adjustment, including a start time, a duration, or periodic time windows.

Instead of a fixed new ED level, in some examples the transmitting node 405 can specify a different new ED level per selected interferer in the request 435. In addition, the new ED level per selected interferer can be specified implicitly based on the RSSI from the transmitting node. For example, the request 435 may instruct each selected interferer to reduce its ED level to a certain dB below the RSSI of a frame carrying the request 435 or any frame from the transmitting node 405. Therefore, the selected interferer may defer to transmissions from the transmitting node 405 via the reduced ED level. As a variation of the ED level set element, an implicit ED level set element may be introduced and carried in the request 435. Instead of an explicit new ED level, the implicit element may instruct each selected interferer to adjust its ED level by some dB relative to the RSSI from the transmitting node 405. The amount of dB to adjust may be specified in the implicit element.

If the neighboring transmitting node 415 accepts the request 435, the neighboring transmitting node 415 may send an acknowledgement frame 440 to the transmitting node 405. If the transmitting node 405 receives an acknowledgement frame 440 from all the selected interferers, the transmitting node 405 may send an announcement 445 to the selected interferers. The announcement 445 may instruct the selected interferers to start jointly adjusting their ED threshold levels. The request 435 or the announcement 445 may include an ED level set element that identifies a new ED threshold level to be jointly used.

Once the announcement 445 is sent, the transmitting node 405 may adjust its ED level at block 450. Once the ED level set element 445 is received, the neighboring transmitting node 415 may adjust its ED level at block 455. In this manner, the transmitting node 405 and the selected interferers, e.g., neighboring transmitting node 415, may defer to each other via more sensitive ED threshold levels. Instead of being sent by the desired transmitting node 405, the ED level set element 445 can be sent by the receiving node 410 to both node 405 and 415, which will be requested to jointly adjust their ED threshold levels according to the new ED threshold level identified in the ED level set element 445.

FIGS. 5 and 6 provide example ED level set elements. FIG. 5 shows a conceptual diagram of an example of an energy detection level set element 500. The ED level set element 500 may be used by a node to inform another node of an ED threshold level to set on another node. In some examples, the ED level set element 500 may be an example of aspects of at least one of the ED level set elements 225 and 230 described with reference to FIG. 2, the ED level set element 340 and the ED level set element 345 described with reference to FIG. 3, and/or the request 435 and the ED level set element 445 of FIG. 4.

The ED level set element 500 may include an element ID 505 that identifies the element type, a length field 510, and one or more ED threshold levels for different channels. The length field 510 may identify a total number of bits of the remaining fields in the ED level set element 500. The ED level set element 500 may include ED levels for both primary and secondary channels. In the example of FIG. 5, the ED level set element 500 includes an ED threshold level on a primary 20 MHz channel 515, an ED threshold level on a secondary 20 MHz channel 520, an ED threshold level on a secondary 40 MHz channel 525, and an ED threshold level on a secondary 80 MHz channel 530. In some examples, some of the ED threshold levels are different from each other, while in other examples the ED threshold levels may be the same. Further, FIG. 5 illustrates only one example of possible bandwidths and channels. In other examples, other bandwidths or channels may be used.

A node, such as an AP 105, may broadcast, multicast, or unicast the ED level set element 500 to intended recipients via one or more management frames. If a node recipient receives the ED level set element 500 via multicast or unicast, the node can ignore a broadcasted ED level set element 500 for a selected time period. In some examples of the ED level set element 500, a broadcast ignoring duration is included. The broadcast ignoring duration may be another field in the ED level set element 500 that may be set to zero if the ED level set element 500 is broadcasted. After receiving the ED level set element 500 including a broadcast ignoring duration, a node recipient may ignore any broadcasted ED level set element received during that duration, starting from the end of the frame of the ED level set element 500. Additional information as described throughout this disclosure may be included in the ED level set element 500.

FIG. 6 shows a conceptual diagram of an example of a multi-group energy detection level set element 600. In this example, the ED level set element may be extended to specify ED levels for different groups. The multi-group ED level set element 600 may be an example of aspects of at least one of the ED level set elements 225 and 230 described with reference to FIG. 2, the ED level set element 340 and the ED level set element 345 described with reference to FIG. 3, the request 435 and the ED level set element 445 of FIG. 4, and/or the ED level set element 500 described with reference to FIG. 5.

The multi-group ED level set element 600 may include an element ID 505-*a* that identifies the element type and may be an example of aspects of the element ID 505 described with reference to FIG. 5. The multi-group ED level set element 600 may also include a length field 510-*a* that identifies the total bits in the remaining fields and may be an example of aspects of the length field 510 described with reference to FIG. 5. The length field 510-*a* may be used to differentiate between single-group and multi-group ED level set elements. In the case of a multi-group ED level set element such as multi-group ED level set element 600, the length field 510-*a* may be used to identify the number of groups. Specifically, if the total bits of the fields per group are constant, the number of groups can be computed as the length indicated in the length field divided by the total bits of the fields per group. Otherwise, another field may be used to identify the number of groups for a multi-group ED level set element.

In the multi-group ED level set element 600, a group indicator 1 605 may also be included that identifies which nodes the following ED threshold levels may apply to. The group indicator 1 605 may have multiple bits to identify different groups. For example, 00 may identify an infrastructure node group, 01 for a peer-to-peer node group, or the like. In another example, 00 and 01 may identify the groups of stations with good and poor performance. The groups and their corresponding identifying bits may be predefined and a table listing the groups and bits may be accessible to and/or stored at each node. In another example, the group indicator 1 605 may be a sequence of bits where each bit position uniquely identifies a distinct station association ID (AID). A station is included in the group if the bit corresponding to its AID is set as "1," for example. The multi-group ED level set element 600 may include up to N group indicators, one for each group. The example of FIG. 6 includes a group indicator N 615. The multi-group ED level set element 600 may not include the group indicators 605 and 615 if the groups are listed in a fixed order known to the other nodes in the wireless communications network.

The multi-group ED level set element 600 may also include the ED levels for each group. For example, multi-group ED level set element 600 includes an ED levels for Group 1 field 610 and an ED levels for Group N field 620. The ED level set element 600 may include ED levels for both primary and secondary channels. In some examples, some of the ED threshold levels for or of each group may be different from each other, while in other examples the ED threshold levels may be the same.

Figure 7:
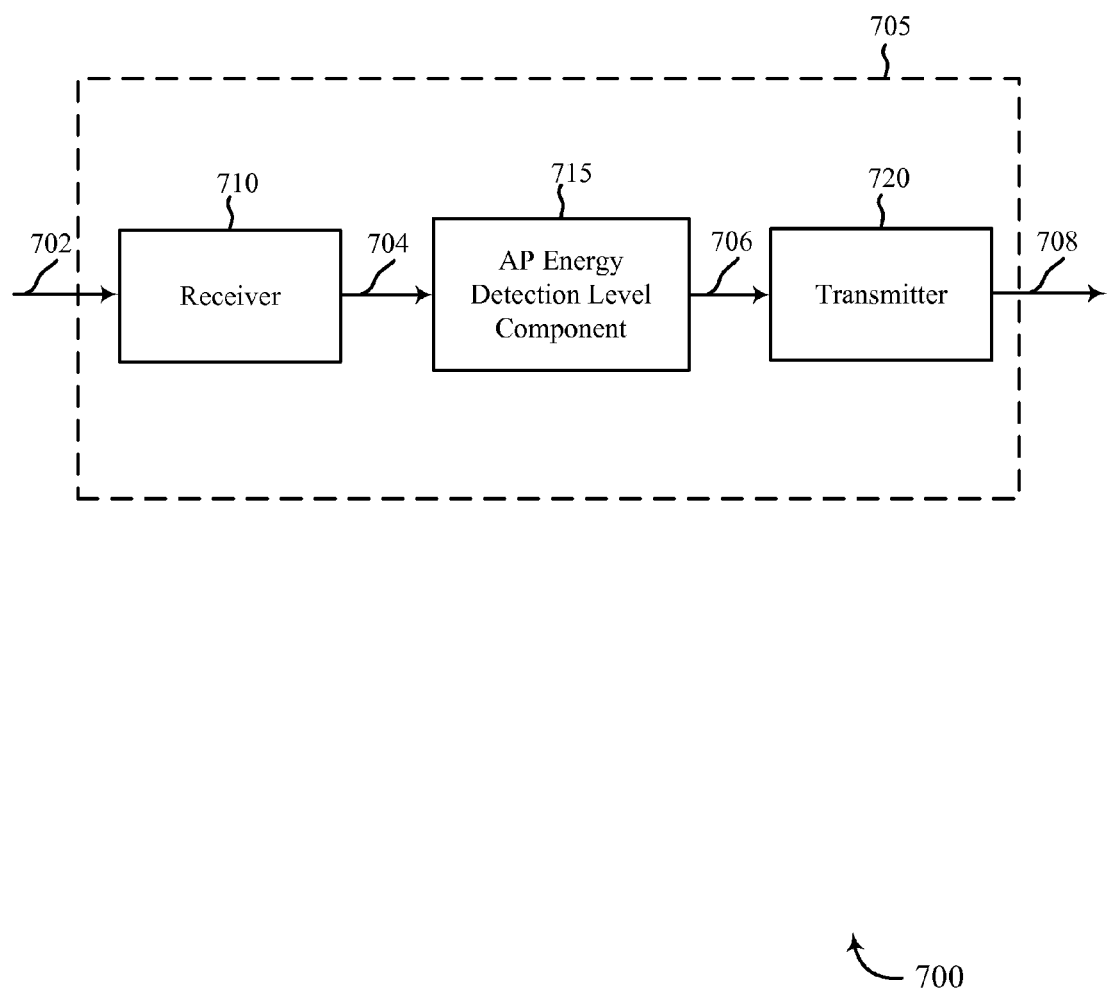
FIG. 7 shows a block diagram of an example of an apparatus for use in wireless communication.

FIG. 7 shows a block diagram 700 of an example of an apparatus 705 for use in wireless communication. In some examples, the apparatus 705 may be configured as an AP and be an example of aspects of one or more of the APs 105 and/or nodes 405, 410, and/or 415 described with reference to any of FIGS. 1-4. In other examples, the apparatus 705 may be configured as a central node and may be an example of aspects of one or more of the central nodes 130 described with reference to any of FIGS. 1-2. The apparatus 705 may also be a processor. The apparatus 705 may include a receiver 710, an AP ED level component 715, and/or a transmitter 720. Each of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a radio frequency spectrum. In some examples, the radio frequency spectrum may be used for LTE/LTE-A and WLAN communications, as described, for example, with reference to any of FIGS. 1-4. The receiver 710 may be used to receive various types of data and/or control signals 702 (i.e., transmissions) over one or more communication links of a wireless communication system, such as one or more communication links 125 or one or more backhaul links 132 of the wireless communication system 100 described with reference to FIG. 1. The receiver 710 may receive the signals 702 that may be used to detect interference, one or more metrics, a report of interferers, a request to adjust an ED level, and/or an announcement.

The AP ED level component 715 may receive various types of data and/or control signals 704 from the receiver 710. In some examples, the AP ED level component 715 may be an example of an ED level adjustor 140 as shown in FIG. 1, although for an AP 105. The AP ED level component 715 may use the signals 704 to determine a new ED threshold level based on interference to one or more nodes in a BSS of the apparatus 705. The AP ED level component 715 may further determine which method of ED level adjustment to use, such as a common or selective ED level adjustment. The AP ED level component 715 may also determine which other nodes (e.g., APs or stations) within the wireless communications network to request to adjust their ED threshold levels. The AP ED level component 715 may generate an ED level set element, such as ED level set elements 500 and 600 described with reference to FIGS. 5 and/or 6. The AP ED level component 715 may provide various types of data and/or control signals 706 to the transmitter 720. The signals 706 may be related to an acknowledgement, an ED level set element, an announcement, or a request, for example.

In some examples, the transmitter 720 may include at least one RF transmitter, such as at least one RF transmitter operable to transmit ED level set elements. The transmitter 720 may receive the various types of data and/or control signals 706 from the AP ED level component 715. The transmitter 720 may be used to transmit various types of data and/or control signals 708 (i.e., transmissions) over one or more communication links of a wireless communication system, such as one or more communication links 125 of the wireless communication system 100 described with reference to FIG. 1. The signals 708 may be based at least in part on the signals 706. The transmitter 720 may also transmit data to a station, such as a station 110 as described, for example, with reference to any of FIGS. 1-3, during a communication session with the station. For example, the transmitter 720 may transmit ED level set elements, announcements, requests, and/or acknowledgements.

Figure 8:
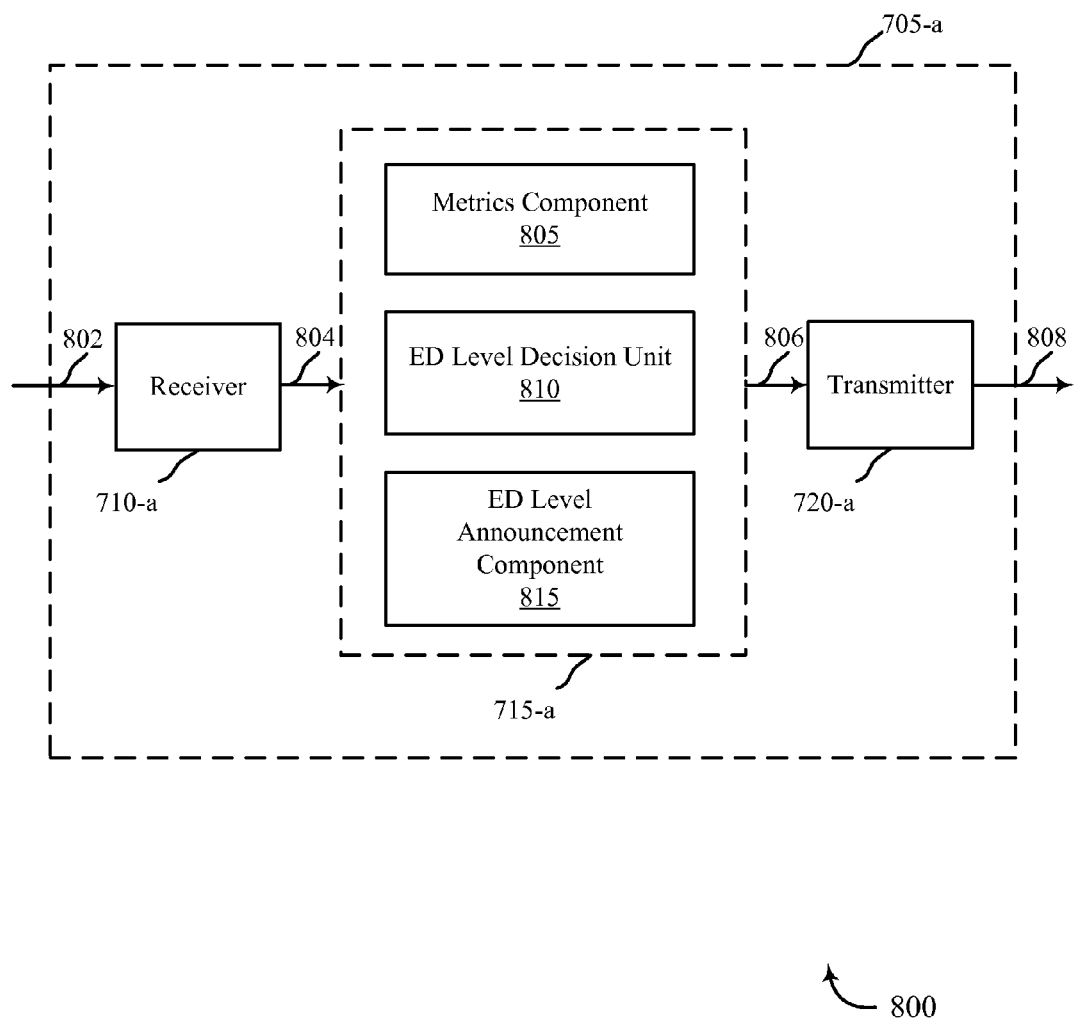
FIG. 8 shows a block diagram of another example of an apparatus for use in wireless communication.

FIG. 8 shows a block diagram of another example of an apparatus 705-*a* for use in wireless communication. The apparatus 705-*a* may be an example of aspects of the apparatus 705 (of FIG. 7). In some examples, the apparatus 705-*a* may include a receiver 710-*a* and a transmitter 720-*a* that may be examples of the receiver 710 and the transmitter 720, respectively, and may be configured to perform operations (e.g., via signals 802 and 808, respectively) as previously described with reference to FIG. 7. In additional examples, the apparatus 705-*a* may include an AP ED level component 715-*a*, which may be an example of aspects of the AP ED level component 715 described with reference to FIG. 7. In some examples, the apparatus 705-*a* may be configured as an AP and be an example of aspects of one or more of the APs 105 and/or nodes 405, 410, and/or 415 described with reference to any of FIGS. 1-4. In other examples, the apparatus 705 may be configured as a central node and may be an example of aspects of one or more of the central nodes 130 described with reference to any of FIGS. 1-2. Each of the components of the apparatus 705-*a* may be in communication with each other.

The components of the apparatus 705-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the AP ED level component 715-*a* may receive, via signals 804, one or more messages from the receiver 705-*a*, that were received via signals 802. The AP ED level component 715-*a* may send, via signals 806, one or more messages to the transmitter 715-*a*. In some examples, the AP ED level component 715-*a* may include a metrics component 805, an ED level decision unit 810, and/or an ED level announcement component 810. The metrics component 805 may also be referred to herein as a metrics analyzer. While FIG. 8 illustrates specific examples of the functions performed by each of the components 805, 810, and 815, the functions performed by each of the components 805, 810, and 815 may in some cases be combined, divided, or implemented using one or more other components.

In some examples, the metrics component 805 may be used to receive (e.g., via the receiver 710-*a*) one or more metrics. The metrics component 805 may analyze the metrics to determine whether a node within its BSS is significantly suffering interference. The metrics component 805 may also determine if other nodes without its BSS are significantly suffering interference. The metrics component 805 may also identify one or more interferers.

The ED level decision unit 810 may determine an ED threshold level that would reduce interference. The ED level decision unit 810 may select whether to use a common ED level adjustment or a selective ED level adjustment. If the ED level decision unit 810 determines to use a common ED level adjustment, the ED level decision unit 810 may determine whether to use a centralized or coordinated method. In examples where the apparatus 705-*a* is a central node, the apparatus 705-*a* may use the centralized method.

The ED level announcement component 815 may generate one or more ED level set elements that identify which nodes and/or interferers are included in the ED threshold level adjustment and also identifies one or more new ED threshold levels. The ED level announcement component 815 may transmit, via the transmitter 720-*a*, the ED level set elements. The transmitter 720-*a* may transmit the ED level set elements using broadcast, unicast, or multicast frames. In some examples, the AP ED level component 715-*a* may also include a range detector that determines a threshold range used to identify one or more other APs that are included in adjusting to a common ED threshold level.

Figure 9:
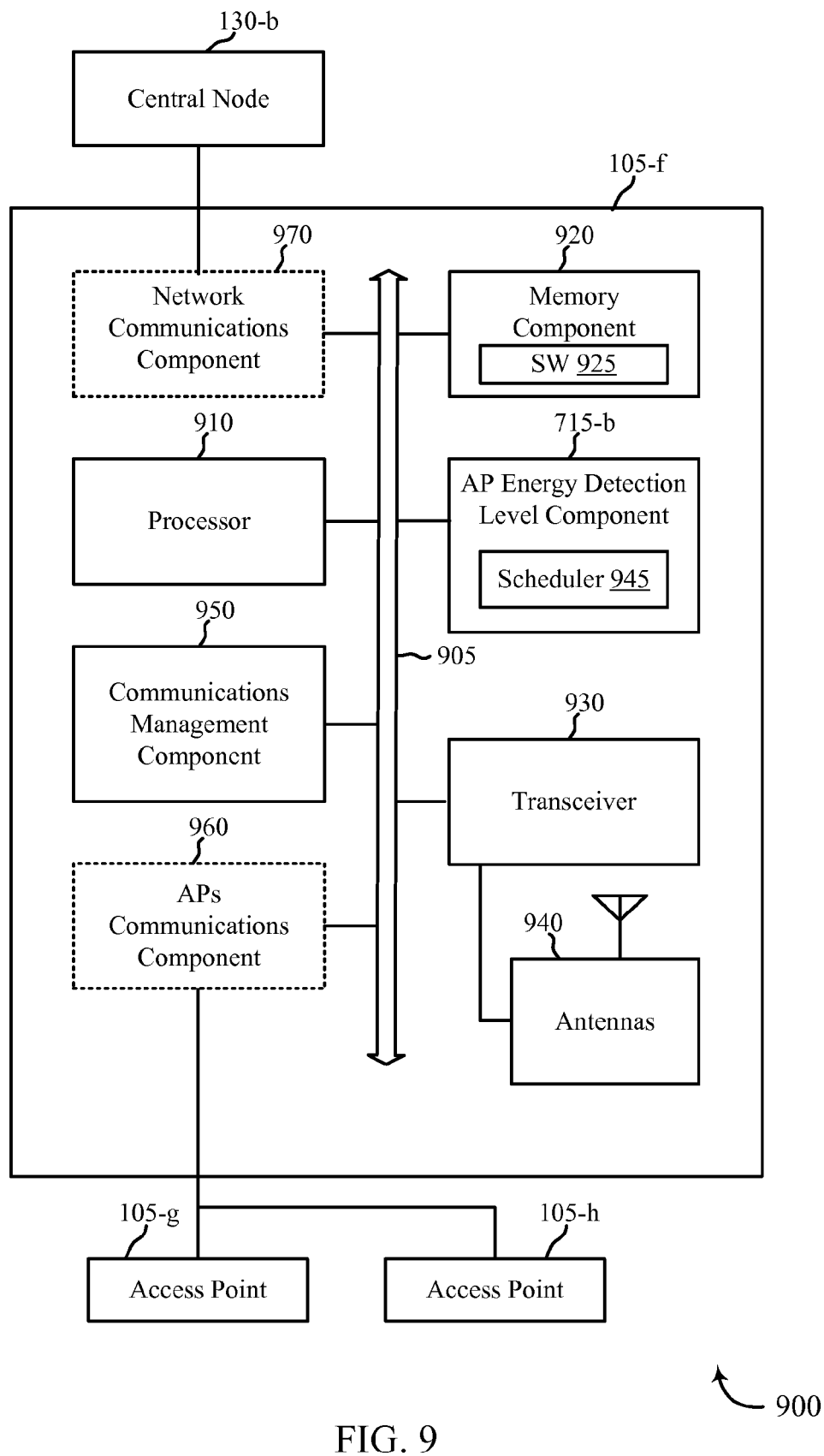
FIG. 9 shows a block diagram of an example of an access point for use in wireless communication.

Turning to FIG. 9, a diagram 900 is shown that illustrates an access point or AP 105-*f* configured for adjusting ED threshold levels in a wireless communications network. In some aspects, the AP 105-*f* may be an example of the APs 105 of FIGS. 1-3. The AP 105-*f* may include a processor 910, a memory component 920, a transceiver component 930, antennas 940, and an AP ED level component 715-*b*. The AP ED level component 715-*b* may be an example of the AP ED level components 715 of FIGS. 7 and 8. In some examples, the AP 105-*f* may also include one or both of an APs communications component 960 and a network communications component 970. Each of these components may be in communication with each other, directly or indirectly, over at least one bus 905.

The memory component 920 may include random access memory (RAM) and read-only memory (ROM). The memory component 920 may also store computer-readable, computer-executable software (SW) code 925 containing instructions that are configured to, when executed, cause the processor 910 to perform various functions described herein for adjusting ED threshold levels, for example. Alternatively, the software code 925 may not be directly executable by the processor 910 but be configured to cause the computer, e.g., when compiled and executed, to perform functions described herein.

The processor 910 may include an intelligent hardware device, e.g., a central processing unit (CPU), a microcontroller, an ASIC, etc. The processor 910 may process information received through the transceiver component 930, the APs communications component 960, and/or the network communications component 970. The processor 910 may also process information to be sent to the transceiver component 930 for transmission through the antennas 940, to the APs communications component 960, and/or to the network communications component 970. The processor 910 may handle, alone or in connection with the AP ED level component 715-*b*, various aspects related to improve throughput and PER by allowing adjustable ED levels.

The AP ED level component 715-*b* may include a scheduler 945. The scheduler 945 may determine a time schedule for executing an ED level adjustment to the determined ED threshold level. The time schedule may identify either a single time window start time and a single time window duration or a periodic time window start time, a periodic time window duration, a period, and a number of periods. The transceiver component 930 may transmit a time scheduled that the scheduler 945 determines, which may be included in an ED level set element.

The transceiver component 930 may include a modem configured to modulate the packets and provide the modulated packets to the antennas 940 for transmission, and to demodulate packets received from the antennas 940. The transceiver component 930 may be implemented as at least one transmitter and at least one separate receiver. The transceiver component 930 may be configured to communicate bi-directionally, via the antennas 940, with at least one wireless station 110 as illustrated in FIG. 1, for example. The AP 105-*f* may typically include multiple antennas 940 (e.g., an antenna array). The AP 105-*f* may communicate with a central node 130-*b* through the network communications component 970. The AP 105-*f* may communicate with other APs, such as the access point 105-*g* and the access point 105-*h*, using an APs communications component 960.

According to the architecture of FIG. 9, the AP 105-*f* may further include a communications management component 950. The communications management component 950 may manage communications with stations and/or other devices as illustrated in the WLAN network 100 of FIG. 1. The communications management component 950 may be in communication with some or all of the other components of the AP 105-*f* via the bus or buses 905. Alternatively, functionality of the communications management component 950 may be implemented as a component of the transceiver component 930, as a computer program product, and/or as at least one controller element of the processor 910.

The components of the AP 105-*f* may be configured to implement aspects discussed above with respect FIGS. 1-8, and those aspects may not be repeated here for the sake of brevity. Moreover, the components of the AP 105-*f* may be configured to implement aspects discussed below with respect to FIGS. 10-14 and those aspects may not be repeated here also for the sake of brevity.

Figure 10:
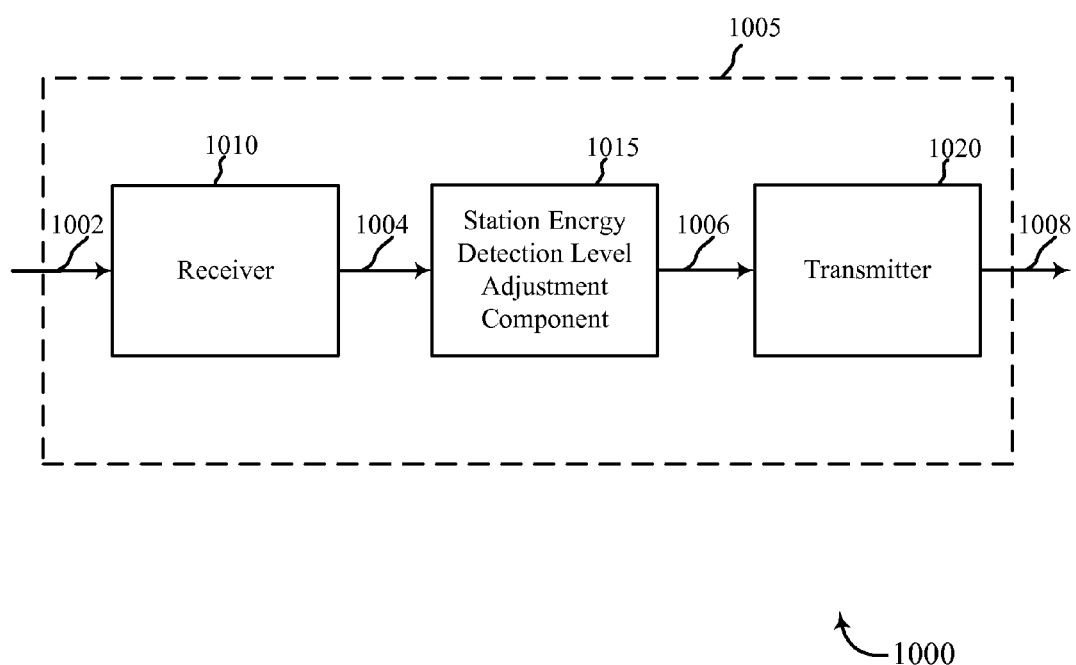
FIG. 10 shows a block diagram of an example of an apparatus for use in wireless communication.

FIG. 10 shows a block diagram 1000 of an apparatus 1005 for use in a station for wireless communication, in accordance with various aspects of the present disclosure. In some examples, the apparatus 1005 may be an example of aspects of one or more of the wireless stations 110 described with reference to FIG. 1 and/or an example of aspects of one or more of the nodes 105, 405, 410, and/or 415 described with reference to FIGS. 2-4. The apparatus 1005 may also be or include a processor. The apparatus 1005 may include a receiver 1010, a station ED level adjustment component 1015, and/or a transmitter 1020. Each of these components may be in communication with each other.

The apparatus 1005, through the receiver 1010, the station ED level adjustment component 1015, and/or the transmitter 1020, may be configured to perform functions described herein. For example, the apparatus 1005 may be configured to adjust its own ED threshold level or to signal other nodes to adjust their ED threshold levels.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The receiver 1010 may receive various types of information such as packets, user data, and/or control signals 1002 (i.e., transmissions) associated with various information channels (e.g., control channels, data channels, etc.). For example, the receiver 1010 may be configured to receive signals 1002 that may cause interference and/or are an ED level set element. Information may be passed on to the station ED level adjustment component 1015, and to other components of the device 1005. In some examples, the station ED level adjustment component 1015 may be an example of an ED level adjustor 140 as shown in FIG. 1.

The station ED level adjustment component 1015 may receive various types of data and/or control signals 1004 from the receiver 1010 and use it to determine that the apparatus 1005 is suffering interference. The station ED level adjustment component 1015 may generate metrics and send the metrics to an AP serving the apparatus 1005. The station ED level adjustment component 1015 may also receive, via the receiver 1010, an ED level set element that identifies an ED threshold level that the apparatus 1005 is requested to use. In some examples, the station ED level adjustment component 1015 may determine that the apparatus 1005 is causing interference, such as by receiving, via the receiver 1010 and signals 1002, a report of interferers that identifies the apparatus 1005 as an interferer. The station ED level adjustment component 1015 may adjust its previous ED threshold level to a new ED threshold level identified in an ED level set element. The station ED level adjustment component 1015 may provide various types of data and/or control signals 1006 to the transmitter 720. The station ED level adjustment component 1015 may forward various types of data and/or control signals 1006 to the transmitter 1020. In some examples, the signals 1006 may include the ED level set element.

The transmitter 1020 may transmit the one or more signals 1006 received from other components of the apparatus 1005. The transmitter 1020 may be used to transmit various types of data and/or control signals 1008 (i.e., transmissions) over one or more communication links of a wireless communication system, such as one or more communication links 125 of the wireless communication system 100 described with reference to FIG. 1. The signals 1008 may be based at least in part on the signals 1006. The transmitter 1020 may transmit a report of interferers, one or more metrics, an acknowledgement, a request, and/or an ED level set element. In some examples, the transmitter 1020 may be collocated with the receiver 1010 in a transceiver component. The transmitter 1020 may include a single antenna, or it may include a plurality of antennas.

Figure 11:
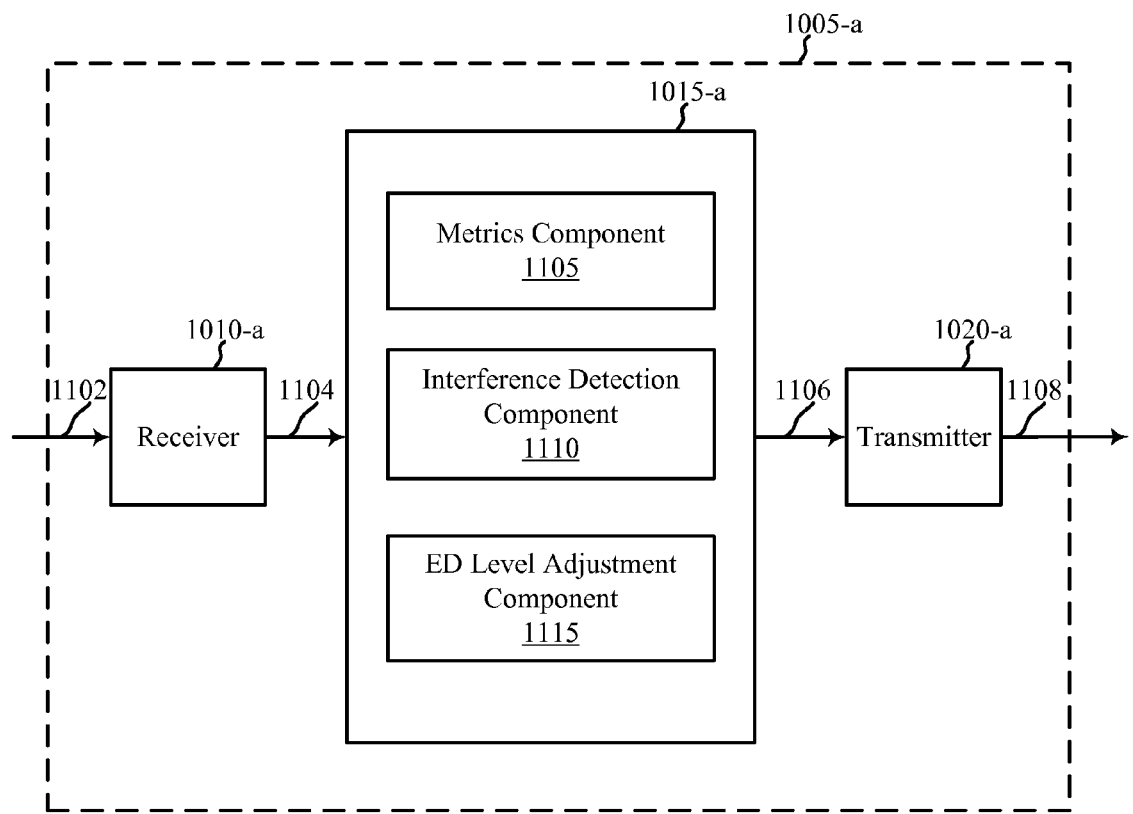
FIG. 11 shows a block diagram of an example of an apparatus that is used in a wireless station for wireless communication.

FIG. 11 shows a block diagram 1100 of an apparatus 1005-a that is used in a wireless station for wireless communication, in accordance with various examples. The apparatus 1005-a may be an example of one or more aspects of a wireless station 110 described with reference to FIG. 1 and/or an example of aspects of one or more of the nodes 105, 405, 410, and/or 415 described with reference to FIGS. 2-4. It may also be an example of an apparatus 1005 described with reference to FIG. 10. The apparatus 1005-a may include a receiver 1010-a and/or a transmitter 1020-a that may be examples of the receiver 1010 and the transmitter 1020, respectively, and may be configured to perform operations (e.g., via signals 1102 and 1108, respectively) as previously described with reference to FIG. 10. The apparatus 1005-a may also include a station ED level adjustment component 1015-a. The apparatus 1005-a may also include a processor. Each of these components may be in communication with each other. The receiver 1010-a and the transmitter 1020-a may perform the functions of the receiver 1010 and the transmitter 1020, of FIG. 10, respectively.

The components of the apparatus 1005-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/ Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the station ED level component 1015-a may receive, via signals 1104, one or more messages from the receiver 1005-a, that were received via signals 1102. The station ED level component 1015-a may send, via signals 1106, one or more messages to the transmitter 1015-a. In some examples, the station ED level adjustment component 1015-a include a metrics component 1105, an interference detection component 1110, and an ED level adjustment component 1115. While FIG. 11 illustrates specific examples of the functions performed by each of the components 1105, 1110, and 1115, the functions performed by each of the components 1105, 1110, and 1115 may in some cases be combined, divided, or implemented using one or more other components.

In some examples, the metrics component 1105 may be used to detect, via one or more received signals (e.g., via the receiver 710-a), one or more performance metrics related to a signal strength and quality of a channel. The metrics component 1105 may provide the metrics to the interference detection component 1110.

The interference detection component 1110 may analyze the metrics to determine whether the apparatus 1005-a is significantly suffering interference. The interference detection component 1110 may also determine if other nodes, such as neighboring nodes, are significantly suffering interference. The interference detection component 1110 may also identify one or more interferers. In some examples, the interference detection component 1110 simply forwards the metrics to the transmitter 1020-a for transmission to a serving AP.

The ED level adjustment component 1115 may determine an ED threshold level that would reduce interference or is identified in an ED level set element received (via receiver 1010-*a*) at the apparatus 1005-*a*. The ED level adjustment component 1115 may confirm whether the received ED level set element applies to the apparatus 1005-*a*. For example, the ED level adjustment component 1115 may determine whether the apparatus 1005-*a* is within a range threshold identified in the ED level set element. The ED level adjustment component 1115 may perform an ED threshold level adjustment based on information received in one or more ED level set elements. The ED level set element may forward, via the transmitter 1020-*a*, the one or more received ED level set elements. The transmitter 1020-*a* may transmit the ED level set elements using broadcast, unicast, or multicast frames.

Figure 12:
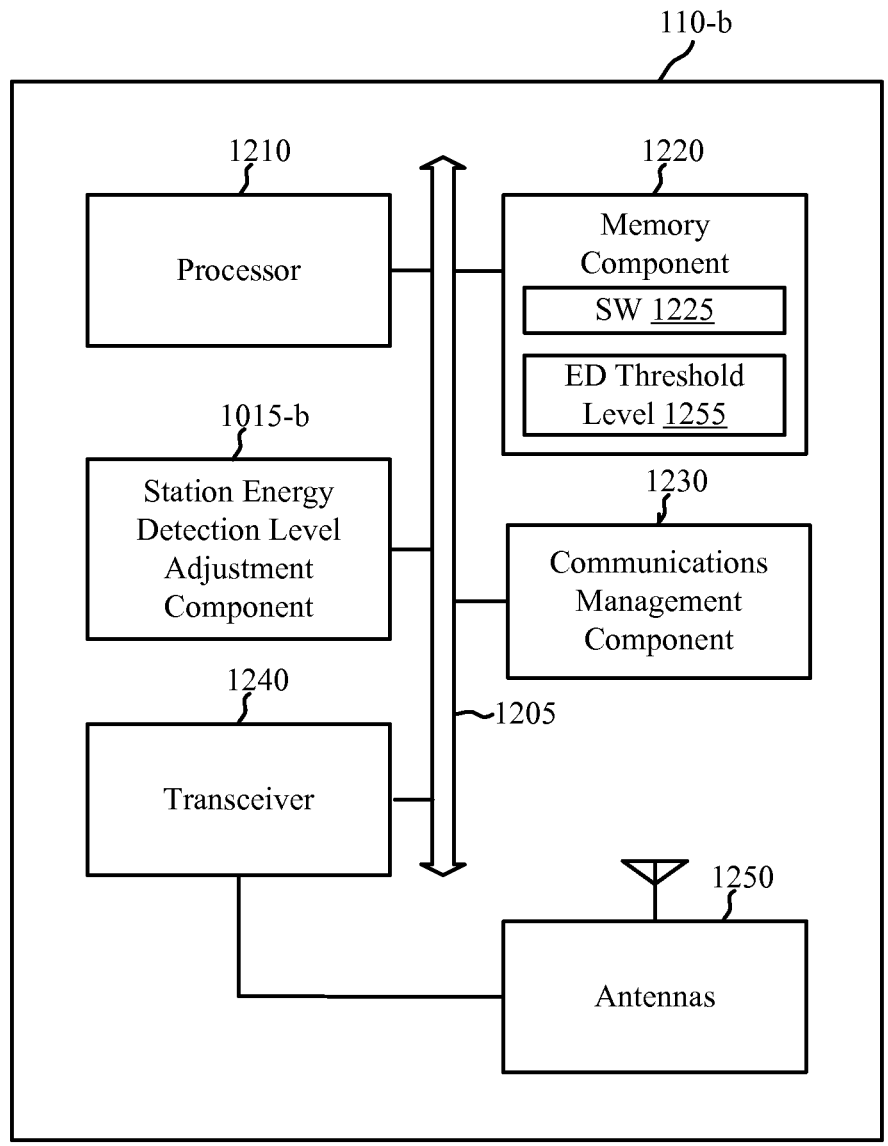
FIG. 12 shows a block diagram of an example of a station for use in wireless communication.

Turning to FIG. 12, a diagram 1200 is shown that illustrates a wireless station 110-*b* configured for adjusting ED threshold levels. The wireless station 110-*b* may have various other configurations and may be included or be part of a personal computer (e.g., laptop computer, netbook computer, tablet computer, etc.), a cellular telephone, a PDA, a digital video recorder (DVR), an internet appliance, a gaming console, an e-reader, etc. The wireless station 110-*b* may have an internal power supply, such as a small battery, to facilitate mobile operation. The wireless station 110-*b* may be an example of the wireless stations 110 described with reference to FIG. 1 and/or an example of aspects of one or more of the nodes 105, 405, 410, and/or 415 described with reference to FIGS. 2-4.

The wireless station 110-*b* may include a processor 1210, a memory component 1215, a transceiver component 1235, antennas 1245, and a station ED level adjustment component 1015-*b*. The station ED level adjustment component 1015-*b* may be an example of the station ED level adjustment component 1015 of FIGS. 10 and 11. Each of these components may be in communication with each other, directly or indirectly, over at least one bus 1205.

The memory component 1215 may include RAM and ROM. The memory component 1215 may store computer-readable, computer-executable software code 1220 containing instructions that are configured to, when executed, cause the processor 1210 to perform various functions described herein for adjusting ED threshold levels. The memory component 1215 may also store an ED threshold level 1250. The ED threshold level 1250 may be updated when the wireless station 110-*b* adjusts the ED threshold level to a common or joint ED threshold level. Alternatively, the software code 1220 may not be directly executable by the processor 1210 but be configured to cause the computer (e.g., when compiled and executed) to perform functions described herein.

The processor 1210 may include an intelligent hardware device, e.g., a CPU, a microcontroller, an ASIC, etc. The processor 1210 may process information received through the transceiver component 1235 and/or to be sent to the transceiver component 1235 for transmission through the antennas 1245. The processor 1210 may handle, alone or in connection with the station ED level adjustment component 1015-*b*, various aspects for improving throughput and PER by allowing adjustable ED levels.

The transceiver component 1235 may be configured to communicate bi-directionally with APs 105 in FIGS. 1-3. The transceiver component 1235 may be implemented as at least one transmitter and at least one separate receiver. The transceiver component 1235 may include a modem configured to modulate the packets and provide the modulated packets to the antennas 1245 for transmission, and to demodulate packets received from the antennas 1245. While the wireless station 110-*b* may include a single antenna, there may be aspects in which the wireless station 110-*b* may include multiple antennas 1245.

According to the architecture of FIG. 12, the wireless station 110-*b* may further include a communications management component 1225. The communications management component 1225 may manage communications with various access points. The communications management component 1225 may be a component of the wireless station 110-*b* in communication with some or all of the other components of the wireless station 110-*b* over the at least one bus 1205. Alternatively, functionality of the communications management component 1225 may be implemented as a component of the transceiver component 1235, as a computer program product, and/or as at least one controller element of the processor 1210.

The components of the wireless station 110-*b* may be configured to implement aspects discussed above with respect to FIGS. 1-11, and those aspects may not be repeated here for the sake of brevity. Moreover, the components of the wireless station 110-*b* may be configured to implement aspects discussed below with respect to FIGS. 13-14, and those aspects may not be repeated here also for the sake of brevity.

Figure 13:
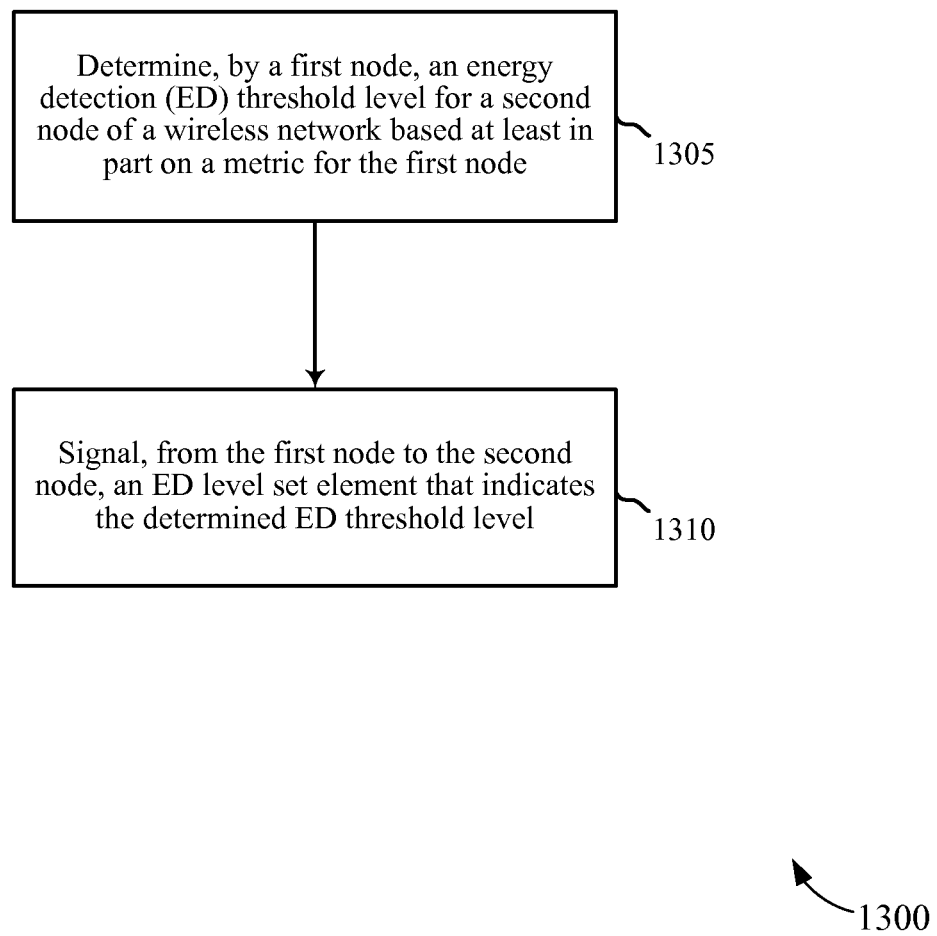
FIG. 13 is a flowchart of a method to determine and signal an energy detection level.

FIG. 13 is a flowchart of a method 1300 to determine and signal an energy detection level. For clarity, the method 1300 may apply to aspects of one or more of the central nodes 130, the APs 105, or the wireless stations 115 (e.g., node) described with reference to any of FIGS. 1-4, 9, and/or 12, and/or aspects of one or more of the apparatuses 705 or 1005 as described with reference to FIGS. 7 and/or 10. In some examples, a node or apparatus may execute one or more sets of codes to control the functional elements of the node or apparatus to perform the functions described below.

At block 1305, the method 1300 may include determining, by a first node, a ED threshold level for a second node of a wireless network based at least in part on a metric for the first node. The operation(s) at block 1305 may be performed using the AP ED level component 715 described with reference to any of FIGS. 7-9 and/or the station ED level component 1015 described with reference to any of FIGS. 10-12. In some examples, determining an ED threshold level may further include determining, by the first node, the ED threshold level for a group of nodes, wherein the second node is part of the group of nodes, and wherein the ED level set element further comprises a group indicator that identifies the group of nodes.

At block 1310, the method 1300 may include signaling, from the first node to the second node, an ED level set element that indicates the determined ED threshold level. The operation(s) at block 1310 may be performed using the AP ED level component 715 described with reference to any of FIGS. 7-9 and/or the station ED level component 1015 described with reference to any of FIGS. 10-12. In some examples, signaling the ED level set element may further include signaling the ED level set element on a primary channel and at least one secondary channel. Signaling the ED level set element may further include sending, by the first node, the ED level set element to an access point of the wireless network that instructs the access point to adjust a common ED threshold level for all served nodes of the access point. Signaling the ED level set element may further include forwarding an announcement message that includes the ED level set element to other access points in the wireless network. The ED level set element may be signaled in beacon, and/or a probe/association request and response.

In one example, the method 1300 may further include signaling, by the second node, an ED level adjustment capability of the second node to one or more nodes in the wireless communications network. In some examples, the method 1300 may include signaling, by the first node, and ED level adjustment capability of the first node to one or more nodes, including a serving AP, in the wireless communications network. For example, the second node may inform the first node that the second node has the ED level adjustment capability in advance, so that first node will send ED level set element to second node. In another example, the first node, e.g., an AP, may broadcast its ED level adjustment capability, and the second node, e.g., a STA with ED level adjustment capability, may give higher preference to the first node when deciding to select an AP for association.

The method 1300 may also include signaling a time schedule for executing an ED level adjustment to the determined ED threshold level. The time schedule may identify either a single time window start time and a single time window duration or a periodic time window start time, a periodic time window duration, a period, and a number of periods. Additionally, the method 1300 may also include signaling a range threshold wherein additional nodes that are within the range threshold are instructed to comply with the ED threshold level, wherein the range threshold identifies one or both of a geographical radius from the first node and/or a hop count threshold from the first node.

In some examples, the ED level set element further comprises a broadcast ignoring duration that instructs the second node to ignore the ED level set element in a broadcast frame for the broadcast ignoring duration responsive to the ED level set element received in unicast or multicast frames.

The method 1300 may also include collecting metrics, at the first node, from other nodes in the wireless network, wherein determining the ED threshold level is based at least in part on the metrics collected from the other nodes. The method 1300 may further include applying, by the first node, the ED threshold level to the other nodes in the wireless network when a threshold number of the other nodes suffer interference. In this example, the first node may be a central node. In another example, the method 1300 includes sending, by the first node, the ED level set element to an access point of the wireless network that instructs the access point to adjust a common ED threshold level for all served nodes of the access point. In yet another example, the method 1300 may include forwarding the ED level set element, by the access point, to other access points in the wireless network.

Additionally, the method 1300 may further include determining, by the first node, interference conditions for neighboring nodes. In other examples, the method 1300 further includes sending, by the first node, the ED level set element to at least one of the neighboring nodes, to adjust the ED threshold level of the at least one neighboring node to the ED threshold level based at least in part on the interference conditions. The interference conditions may include whether neighboring nodes are interferers to a receiver of the first node.

The method 1300 may also include adjusting, by the first node, an original ED threshold level of the second node to the ED threshold level. In some examples, the method 1300 includes adjusting the ED threshold level of the first node.

In some examples, determining the ED threshold level for the second node may further include determining, by the first node, the ED threshold level for the second node as an amount of decibel (dB) relative to a RSSI from the first node, wherein the RSSI can be determined by the frame carrying the ED level set element or any frame from the first node. For example, the ED threshold level may be determined as X dB relative to the RSSI from the first node. Another example of the method 1300 includes determining a RSSI from one of a frame carrying the ED level set element or another frame transmitted by the first node, wherein signaling the ED level set element further comprises signaling an amount of decibel (dB) relative to the RSSI to instruct the second node to adjust the ED threshold level of the second node by the amount of dB relative to the RSSI.

In yet another example, the method 1300 may further include classifying all nodes in a BSS into at least two groups. In some examples, the BSS includes the second node. The method 1300 may further include determining a different ED threshold level for each group. The method 1300 may also include signaling a second ED level set element that indicates the different ED threshold levels for each group to an access point serving the BSS. In some examples, classifying all nodes in the BSS into at least two groups may further include determining, for each node in the BSS, whether a performance metric of the node exceeds a threshold. The performance metric may include at least one of a throughput of the node, a packet error rate of the node, an access delay, a retry rate, a packet latency, a signal strength to or from the AP and the node, or combinations thereof. The method may also include classifying each node with the performance metric exceeding the threshold into a first group and classifying each node with the performance metric below the threshold into a second group. For example, all nodes associated with an AP can be classified into different groups with different ED levels that are applied to the communications of the different groups with the access point. The AP may signal the common ED level per group to the group using an ED level set element for that group.

In some examples, classifying all of the nodes in the BSS may further include classifying each nodes in the BSS based on a common agreement across all access points in the wireless network. The method 1300 may further include allocating dedicated resources to each of the nodes based on the group of the node, wherein the dedicated resources are allocated based on a common agreement across all access points in the wireless network and signaling the dedicated resources to the group via an ED level set element for the group. For example, the node groups may communicate with their respective AP using different dedicated resources (e.g., dedicated time slots). The dedicated resources may be allocated based on a common agreement across the access points in a network. The dedicated resource per group can be signaled by the AP to that group via the ED level set element for that group.

The ED threshold levels adjustment described herein may be a dynamic adjustment. For example, the ED threshold levels may be adjusted responsive to changing network conditions. Instead of the energy detection threshold levels being preset to specific levels, the techniques, devices, and systems described herein facilitate the ED threshold levels being dynamically adjusted.

Figure 14:
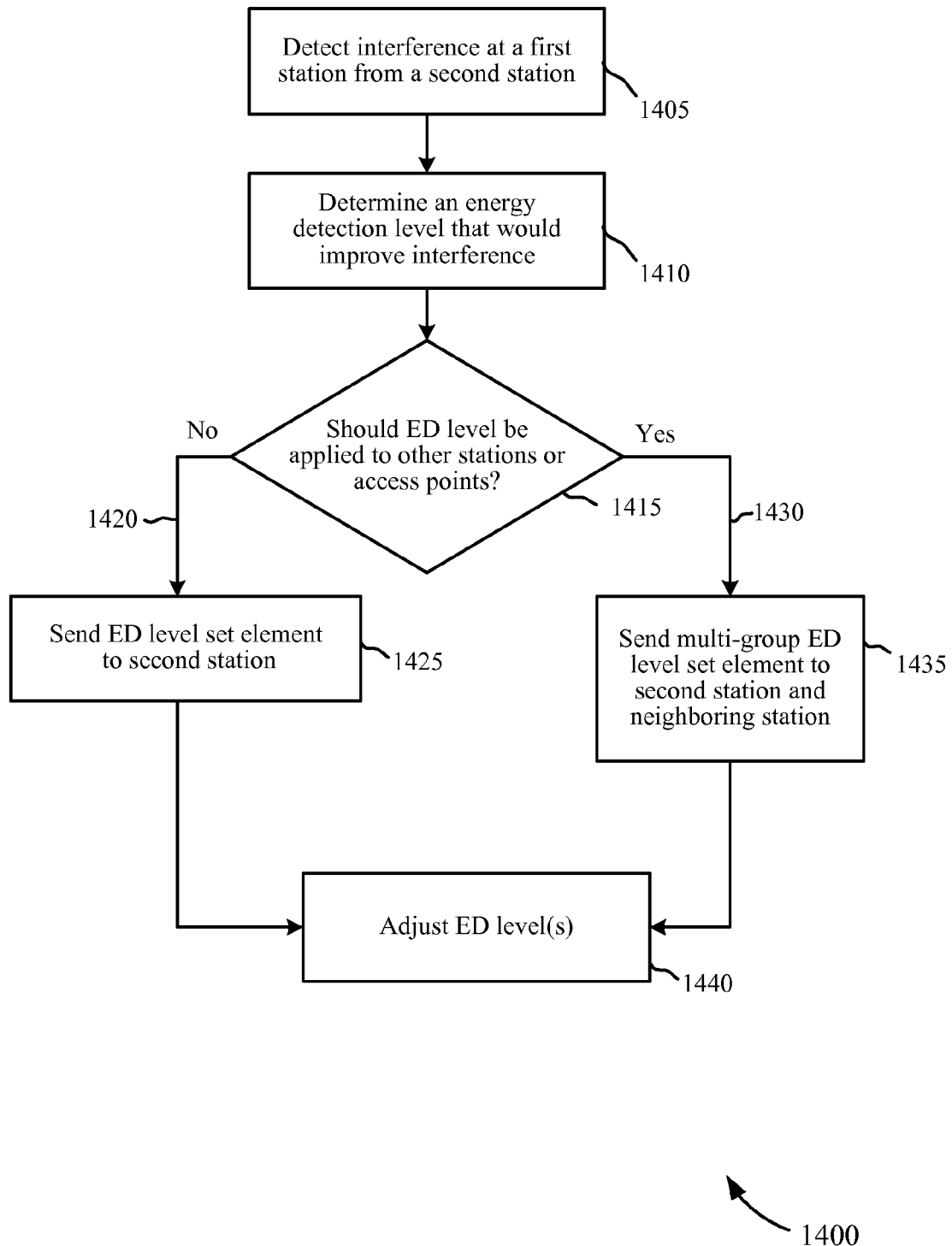
FIG. 14 is a flowchart of a method to adjust one or more energy detection levels in a wireless communication system.

FIG. 14 is a flowchart of a method 1400 to adjust one or more energy detection levels in a wireless communication system. For clarity, the method 1400 may apply to aspects of one or more of the central nodes 130, the APs 105 and the wireless stations 115 (e.g., node) described with reference to any of FIGS. 1-4, 9, and/or 12, and/or aspects of one or more of the apparatuses 705 or 1005 as described with reference to FIGS. 7 and/or 10. In some examples, a node or apparatus may execute one or more sets of codes to control the functional elements of the node or apparatus to perform the functions described below.

At block 1405, the method 1400 detects interference at a first station from a second station. The method 1400 may detect interference in any of the number of ways described herein. At block 1410, the method 1400 determines an ED threshold level that would improve interference. In some examples, the method 1400 determines the ED threshold level via receiving an ED level set element from another station or AP.

At block 1415, the method 1400 determines whether the common ED threshold level should be applied to other stations or APs. This may be determined based on how strong the interference is, a percentage of stations in a BSS significantly suffering interference, whether other nodes are capable of adjusting ED threshold levels, a distance of the other nodes from the first station, or the like. If it is determined that no other station or AP should use the common ED threshold level, the method 1400 proceeds along path 1420 to block 1425. At block 1425, the method 1400 includes instructing the second station to adjust to the common ED threshold level via sending an ED level set element to the second station.

If it is determined that at least one other station or AP should use the common ED threshold level, the method 1400 proceeds along path 1430 to block 1435. At block 1435, the method 1400 may include sending a multi-group ED level set element to the second station and to any neighboring station that should also adjust its ED threshold level. At block 1440, the method 1400 may include adjusting the ED threshold level of the first station to the common ED threshold level.

The examples described herein provide a way to improve throughput and PER by allowing adjustable ED levels. Some examples provide a centralized or a coordinated common ED level adjustment. Further examples provide a selective ED adjustment that may be coordinated between a transmitter suffering from interference and an interfering transmitter. A new information element may be introduced in order to set the ED level on a device. In some examples, the ED level information element may specify ED levels for different groups of APs and/or stations.

As described herein, a common ED threshold may be optimized across a wireless communications network. A central node collects performance metrics per the BSS from APs in the network. The metrics may include station throughput, packet error rate, medium usage, and number of stations significantly suffering interference. The central node may send an ED level set element to APs to adjust common ED level if most stations in the network significantly suffer interference or if a common ED level is found to improve overall performance. After receiving the announcement from the central node, the APs may broadcast the new ED levels for its stations to follow.

In another example, each individual transmitter may selectively set its own ED threshold and may request neighboring transmitters to change their ED thresholds in a coordinated adjustment. For example, an interfering transmitting node may reduce the ED thresholds for itself and for the suffering transmitting node in order that both transmitting nodes can hear each other's transmissions within the ED range. For example, an AP may broadcast metrics in order to indicate interference conditions in the BSS. The AP may send an ED level set element to neighboring APs to adjust to a common ED threshold level. Other APs may then forward the ED level set element. After receiving the ED level set element, each AP may broadcast the new ED level and related information within its BSS.

In another example, a selective ED level adjustment method is provided. A receiving node may report interference to a transmitting node if the receiving node is significantly suffering interference. The transmitting node may request the interferer for a joint ED level adjustment. Thus, both a transmitting node and a neighboring transmitting node can adjust their ED levels to improve network performance.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for Wi-Fi wireless communication, comprising:
    determining, by a first node, an energy detection (ED) threshold level for a second node of a wireless network based at least in part on a metric for the first node;
    signaling, from the first node to the second node, a first ED level set element that indicates the determined ED threshold level;
    classifying all nodes in a basic service set (BSS) including the second node into at least two groups of nodes;
    determining a different ED threshold level for each group of nodes; and
    signaling a second ED level set element that indicates the different ED threshold level for each group of nodes to an access point serving the BSS.

2. The method of claim 1, further comprising:
    signaling, by at least one of the first node and the second node, an ED level adjustment capability of the at least one of the first node and the second node to one or more nodes in the wireless network.

3. The method of claim 1,
    wherein the first ED level set element further comprises a group indicator that identifies the group of nodes that includes the second node.

4. The method of claim 1, wherein determining the ED threshold level for the second node further comprises:
    determining, by the first node, the ED threshold level for the second node as an amount of decibel (dB) relative to a received signal strength indication (RSSI) from the first node, wherein the RSSI can be determined by a frame carrying the first ED level set element or any frame from the first node.

5. The method of claim 1, further comprising:
    determining a received signal strength indication (RSSI) from one of a frame carrying the first ED level set element or another frame transmitted by the first node,
    wherein signaling the first ED level set element further comprises signaling an amount of decibel (dB) relative to the RSSI to instruct the second node to adjust the ED threshold level of the second node by the amount of dB relative to the RSSI.

6. The method of claim 1, further comprising:
    signaling a time schedule for executing an ED level adjustment to the determined ED threshold level, wherein the time schedule identifies either a single time window start time and a single time window duration or a periodic time window start time, a periodic time window duration, a period, and a number of periods.

7. The method of claim 1, further comprising:
    signaling a range threshold wherein additional nodes that are within the range threshold are instructed to comply with the ED threshold level, wherein the range threshold identifies one or both of:
    a geographical radius from the first node, and
    a hop count threshold from the first node.

8. The method of claim 1, wherein the ED level set element further comprises a broadcast ignoring duration that instructs the second node to ignore the first ED level set element in a broadcast frame for the broadcast ignoring duration responsive to the first ED level set element received in unicast or multicast frames.

9. The method of claim 1, further comprising:
    collecting metrics, at the first node, from other nodes in the wireless network, wherein determining the ED threshold level is based at least in part on the metrics collected from the other nodes.

10. The method of claim 9, further comprising:
    applying, by the first node, the ED threshold level to the other nodes in the wireless network when a threshold number of the other nodes suffer interference.

11. The method of claim 9, further comprising:
    sending, by the first node, the first ED level set element to an access point of the wireless network that instructs the access point to adjust a common ED threshold level for all served nodes of the access point; and
    forwarding the first ED level set element, by the access point, to other access points in the wireless network.

12. The method of claim 1, wherein classifying all nodes in the BSS including the second node into at least two groups of nodes further comprises:
    determining, for each node in the BSS, whether a performance metric of the node exceeds a threshold, wherein the performance metric includes at least one of a throughput of the node, a packet error rate of the node, an access delay, a retry rate, a packet latency, a signal strength between the node and a serving access point;
    classifying each node with the performance metric exceeding the threshold into a first group; and
    classifying each node with the performance metric below the threshold into a second group.

13. The method of claim 12, wherein classifying all of the nodes in the BSS further comprises:
classifying each nodes in the BSS based on a common agreement across all access points in the wireless network.

14. The method of claim 1, further comprising:
allocating dedicated resources to each of the nodes based on the group of the node, wherein the dedicated resources are allocated based on a common agreement across all access points in the wireless network; and
signaling the dedicated resources to the group via an ED level set element for the group.

15. The method of claim 1, further comprising:
determining, by the first node, interference conditions for neighboring nodes, wherein the interference conditions include whether neighboring nodes are interferers to a receiver of the first node; and
sending, by the first node, the first ED level set element to at least one of the neighboring nodes, to adjust the ED threshold level of the at least one neighboring node to the ED threshold level based at least in part on the interference conditions.

16. A device for Wi-Fi wireless communication, comprising:
an energy detection (ED) level decision unit to determine an ED threshold level for a first node of a wireless network based at least in part on a metric of the first node, classify all nodes in a basic service set (BSS) including the first node into at least two groups, and determine a different ED threshold level for each group; and
a transmitter to signal a first ED level set element that indicates the determined ED threshold level and a second ED level set element that indicates the different ED threshold level for each group to an access point serving the BSS.

17. The device of claim 16, further comprising:
the transmitter to signal an ED level adjustment capability of the first node to one or more nodes in the wireless network.

18. The device of claim 16, further comprising:
the transmitter to signal the ED level set element that further comprises a group indicator that identifies one of the groups of nodes.

19. The device of claim 16, further comprising:
a scheduler to determine a time schedule for executing an ED level adjustment to the determined ED threshold level, wherein the time schedule identifies either a single time window start time and a single time window duration or a periodic time window start time, a periodic time window duration, a period, and a number of periods; and
the transmitter to signal the time schedule.

20. The device of claim 16, further comprising:
a range detector to determine one of a geographical radius from the first node and a hop count threshold from the first node, wherein additional nodes that are within the range threshold are instructed to comply with the ED threshold level;
a scheduler to determine a broadcast ignoring duration that instructs the first node to ignore the ED level set element in a broadcast frame for the broadcast ignoring duration responsive to the ED level set element received in unicast or multicast frames;
the transmitter to transmit the broadcast ignoring duration and the range threshold;
a metrics analyzer to collect metrics from other nodes in the wireless network, analyze the metrics, and provide the metrics to the ED level decision unit; and
the ED level decision unit to further determine the ED threshold level based at least in part on the metrics.

21. An apparatus for Wi-Fi wireless communication, comprising:
a processor;
memory in electronic communication with the processor and instructions stored in the memory, wherein the instructions are executable by the processor to:
determine an energy detection (ED) threshold level for a node of a wireless network based at least in part on a metric of another node of the wireless network, classify all nodes in a basic service set (BSS) including the other node into at least two groups, and determine a different ED threshold level for each group; and
signal a first ED level set element that indicates the determined ED threshold level and a second ED level set element that indicates the different ED threshold level for each group to an access point serving the BSS.

22. The apparatus of claim 21, wherein the instructions are executable by the processor to:
signal an ED level adjustment capability to one or more nodes in the wireless network.

23. The apparatus of claim 21, wherein the instructions are executable by the processor to:
signal a range threshold wherein additional nodes that are within the range threshold are instructed to comply with the ED threshold level, wherein the range threshold identifies one or both of:
a geographical radius from a first node, and
a hop count threshold from the first node.

24. The apparatus of claim 21, wherein the instructions are executable by the processor to:
signal the first ED level set element to an access point of the wireless network that instructs the access point to adjust a common ED threshold level for all served nodes of the access point.

25. The apparatus of claim 21, wherein the instructions are executable by the processor to:
signal a time schedule for executing an ED level adjustment to the determined ED threshold level, wherein the time schedule identifies either a single time window start time and a single time window duration or a periodic time window start time, a periodic time window duration, a period, and a number of periods.

26. The apparatus of claim 21, wherein the second ED level set element further comprises a broadcast ignoring duration that instructs the other node to ignore the first ED level set element in a broadcast frame for the broadcast ignoring duration responsive to the first ED level set element received in unicast or multicast frames.

27. The apparatus of claim 21, wherein the instructions are executable by the processor to:
collect metrics from other nodes in the wireless network, wherein determining the ED threshold level is based at least in part on the metrics collected from the other nodes; and
apply the ED threshold level to the other nodes in the wireless network when a threshold number of the other nodes suffer interference.

28. The apparatus of claim 21, wherein the instructions executable by the processor to classify all nodes in the BSS including the other node into at least two groups further comprises:

determine, for each node in the BSS, whether a performance metric of the node exceeds a threshold, wherein the performance metric includes at least one of a throughput of the node, a packet error rate of the node, an access delay, a retry rate, a packet latency, a signal strength between the node and a serving access point;

classify each node with the performance metric exceeding the threshold into a first group; and classify each node with the performance metric below the threshold into a second group.

29. An apparatus for Wi-Fi wireless communication, comprising:

a processor;

memory in electronic communication with the processor and instructions stored in the memory, wherein the instructions are executable by the processor to:

signal, by a first node, an energy detection (ED) level adjustment capability of the first node to one or more nodes in a wireless network;

receive, by the first node, a first ED level set element that identifies a common ED threshold level; and adjust, by the first node, an ED threshold level to the common ED threshold level; and determine a broadcast ignoring duration from the first ED level set element, wherein the broadcast ignoring duration instructs the first node to ignore a second ED level set element in a broadcast frame that is received at the first node during the broadcast ignoring duration.

30. The apparatus of claim 29, wherein the instructions are executable by the processor to:

determine a range threshold within which the common ED threshold level applies; and determine whether the first node is within the range threshold, wherein adjusting the ED threshold level to the common ED threshold level is based on the determination that the first node is within the range threshold.

\* \* \* \* \*